US010793955B2

(12) United States Patent
Freeman et al.

(10) Patent No.: US 10,793,955 B2
(45) Date of Patent: Oct. 6, 2020

(54) DIGITALLY CONTROLLED CORROSION PROTECTION SYSTEM AND METHOD

(71) Applicant: FREEMAN INDUSTRIES, Cheyenne, WY (US)

(72) Inventors: Jonathan Paul Freeman, Cheyenne, WY (US); Edward Alyn Long, Belleview, FL (US); Adam Spencer Freeman, Cheyenne, WY (US); Jon Andrew Freeman, Dorset, OH (US)

(73) Assignee: FREEMAN INDUSTRIES, Cheyenne, WY (US)

( * ) Notice: Subject to any disclaimer, the term of this patent is extended or adjusted under 35 U.S.C. 154(b) by 151 days.

(21) Appl. No.: 14/217,933

(22) Filed: Mar. 18, 2014

(65) Prior Publication Data

US 2014/0262823 A1   Sep. 18, 2014

Related U.S. Application Data

(60) Provisional application No. 61/789,634, filed on Mar. 15, 2013.

(51) Int. Cl.
  *C23F 13/04*   (2006.01)
  *G01N 17/02*   (2006.01)

(52) U.S. Cl.
  CPC ............. *C23F 13/04* (2013.01); *G01N 17/02* (2013.01)

(58) Field of Classification Search
  CPC .......... C23F 13/02; C23F 13/04; C23F 13/06; C23F 13/22; C23F 2213/10–2213/2213; G01N 27/26–27/49; E02B 17/0026

USPC .......... 204/196.01, 196.02–196.07; 205/724, 205/725, 726, 727, 728, 729
See application file for complete search history.

(56) References Cited

U.S. PATENT DOCUMENTS

| 3,674,662 | A | * | 7/1972 | Haycock | ................. C23F 13/04 205/728 |
| 3,714,004 | A | * | 1/1973 | Riggs, Jr. | ................. C23F 13/04 204/196.03 |
| 4,138,323 | A | * | 2/1979 | Statsenko | ................. C23F 13/04 204/196.02 |

(Continued)

FOREIGN PATENT DOCUMENTS

CN   102698682 A   * 10/2012

*Primary Examiner* — Alexander W Keeling
(74) *Attorney, Agent, or Firm* — Oliff PLC

(57) ABSTRACT

At least one corrosion protection unit is located adjacent to a region of a structure immersed in an electrolyte. Each corrosion protection unit includes a circuit for applying rectified alternating current voltage between the structure and electrodes in the electrolyte. Each corrosion protection unit includes Reference Cells to produce direct current voltage between the Reference Cells and the structure, a measuring circuit coupled to the Reference Cells for measuring the potential between the Reference Cells and the structure, and a control circuit for controlling the level of the rectified alternating current voltage in accordance with the measured potential levels. Corrosion protection units are independent of one another, so that independently established rectified alternating current voltages are applied between different regions of the structure and e first and second corrosion protection units. Alternatively, the corrosion protection units apply constant current or constant voltage instead of Reference Cell feedback control.

21 Claims, 15 Drawing Sheets

(56) References Cited

U.S. PATENT DOCUMENTS

| | | | | | |
|---|---|---|---|---|---|
| 4,255,242 | A | * | 3/1981 | Freeman | G01R 17/00 204/196.03 |
| 4,437,957 | A | * | 3/1984 | Freeman | C23F 13/04 204/196.02 |
| 4,755,267 | A | * | 7/1988 | Saunders | G01N 17/02 204/196.02 |
| 5,077,486 | A | * | 12/1991 | Marson | C23F 13/04 204/196.03 |
| 2002/0008042 | A1 | * | 1/2002 | Pierro, Jr. | G01N 17/02 205/777.5 |
| 2005/0006251 | A1 | * | 1/2005 | Thomas, III | G01N 17/02 205/725 |
| 2006/0054072 | A1 | * | 3/2006 | Sica | B63B 59/00 114/222 |
| 2006/0213765 | A1 | * | 9/2006 | Mizuno | C23F 13/22 204/196.01 |
| 2006/0241876 | A1 | * | 10/2006 | Ingram | H02J 7/0019 702/57 |
| 2007/0035315 | A1 | * | 2/2007 | Hilleary | G01N 17/02 324/700 |
| 2007/0085345 | A1 | * | 4/2007 | Brown | C23F 13/04 290/44 |
| 2007/0251834 | A1 | * | 11/2007 | Bollinger | C23F 13/04 205/727 |
| 2010/0117579 | A1 | * | 5/2010 | Culbert | G05D 23/2442 318/471 |
| 2014/0062490 | A1 | * | 3/2014 | Neuman | C23F 13/22 324/347 |
| 2014/0151241 | A1 | * | 6/2014 | Cahill-O'Brien | C23F 13/22 205/726 |

* cited by examiner

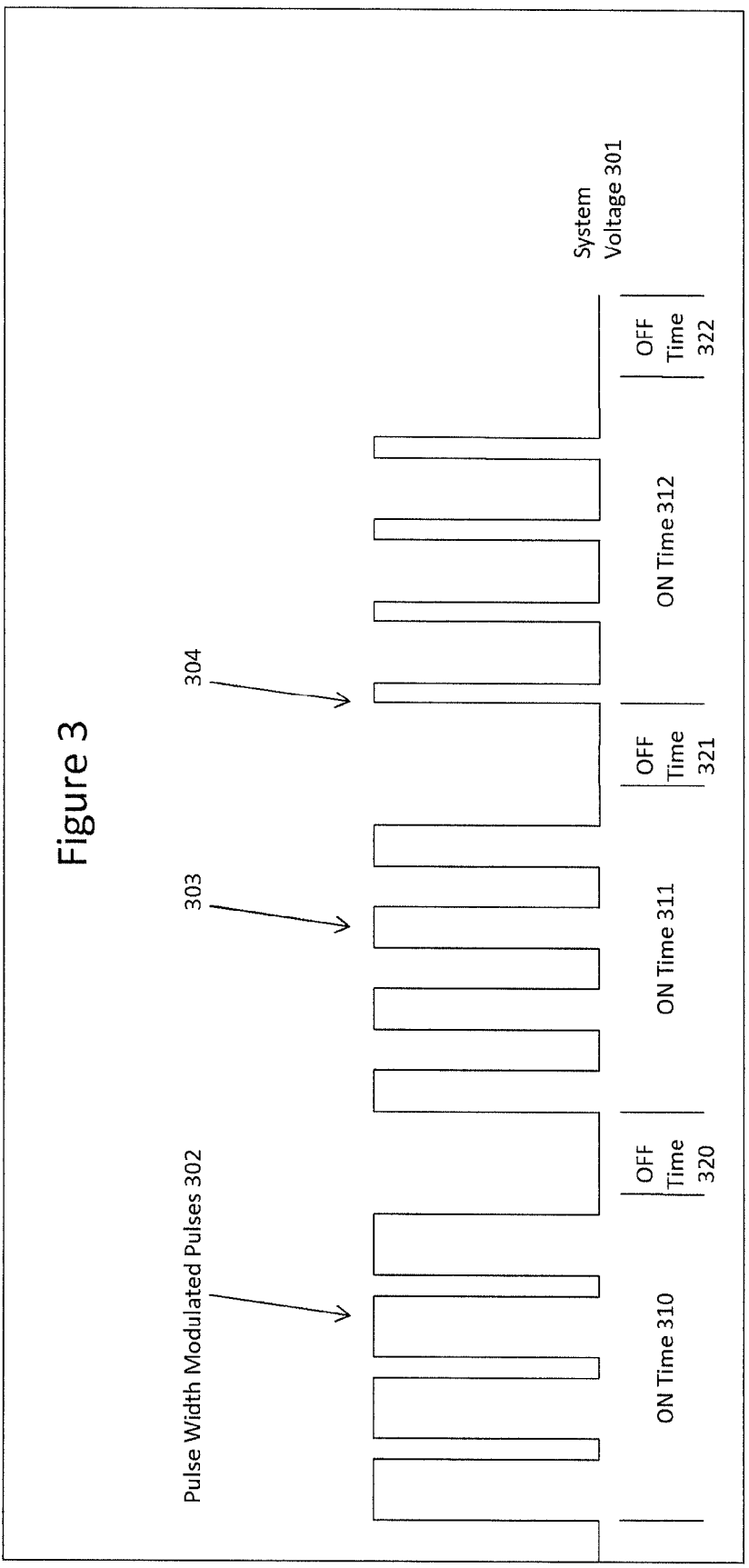

| Terminal No. | Reference | Terminal No. | Reference | Terminal No | Reference |
|---|---|---|---|---|---|
| 431 | AC Power Input | 443 | Anode #2 Output | 455 | Keypad |
| 432 | AC Power Input | 444 | Shunt #3 + Input | 456 | Expansion Connector I2C |
| 433 | Shunt #1 + Input | 445 | Reference Cell #5 | 457 | Shunts |
| 434 | Positive Rectifier #1 Input | 446 | ICSP | 458 | USB |
| 435 | Shunt #1 - Input | 447 | Shunt #3 - Input | 459 | Aux. Communication |
| 436 | Reference Cell #1 | 448 | Anode #3 Output | 460 | System Ground |
| 437 | Anode #1 Output | 449 | Reference Cell #6 | 461 | To SCR Firing Board |
| 438 | Shunt #2 + Input | 450 | Structure Ground | 462 | Positive Rectifier #2 Input |
| 439 | Reference Cell #2 | 451 | Shunt #4 + Input | 471 | Configuration |
| 440 | Shunt #2 - Input | 452 | Shunt #4 - Input | 481 | Ground |
| 441 | Reference Cell #3 | 453 | Anode #4 Output | | |
| 442 | Reference Cell #4 | 454 | Expansion Connector SPI | | |

```
**** Operator Reporting Commands ****
----------------------------------------
? - Print Command List
AT - Print Ambient Temperature
AV1-4 - Print Anode Voltage - AV#
C1-6 - Print Cell Voltage - C#
C5X - Enable/disable reference cell 5 reading (1 or 0 for X)
C6X - Enable/disable reference cell 6 reading (1 or 0 for X)
DC - Print Pulse Width Modulator Duty Cycles
DMT - Display Measurement Time
PA - Print System Report (Print All)
PC - Print Real-Time Clock Calibration Register
PD - Print DIP Switch Setting
PSD - Print Service Date
PSN - Print Serial Number
SH1-4 - Print Shunt Current - SH#
T - Print time from Real-Time Clock
VER - Print Firmware Version Number
```

```
**** System Setup Commands ****
----------------------------------------
AUTOX - Set Channel X to Auto Mode - Ex.: AUTO1) (Cancels Manual Mode)
CT - Set Cycle Time - 2 digits - Ex.: CT40
CTEMP - Clear Min/Max Temperatures
DI - Initialize the LCD Display
LXYY - Set max limit for PWM duty cycle for Channel X at YY% - Ex.: L145
LCX - Clear PWM Limit for Channel X - Ex.: LC1
MANXYY - Set Channel X to Manual Mode with Duty Cycle YY - Ex.: MAN135)
MT - Set Measurement Time - Ex.: MT495 (MT is 4.95 seconds)
RCXYYY - Set Cell X Target at Voltage YYY - Ex.: RC1085 (Cell 1 at 0.85V)
S - Set Real-Time Clock Time - SMMDDYYHHMMSSDOW (DOW 1 = SUN)
SC - Set Real-Time Clock Calibration Register - Ex.: SC04
SDC### - Set Channel PWM Duty Cycle - Ex.: SDC145 = Channel 1, 45%
SHFS### Setting - Set DC Shunt (1-4) Full Scale - Ex.: SHFS105 (Shunt1 5A)
SRTC - Start Real-Time Clock
SSD - Set Service Date - 6 digits - Ex.: SSD053012 (MMDDYY)
SSN  Set Serial Number - 12 digits - Ex.: SSN2013MD000300
```

```
**** System Test Commands ****
---------------------------------------
POLX - Short depolarization measurement on channel X - Ex.: POL1
POLMX - One minute depolarization measurement on channel X - Ex.: POLM1
POLHX - One hour depolarization measurement on channel X - Ex.: POLH1
EPOLX - Short depolarization with Excel compatible output - Ex.: EPOL1
EPOLMX - One minute depolarization with Excel compatible output - Ex.: EPOLM1
EPOLHX - One hour depolarization with Excel compatible output - Ex.: EPOLH1
```

```
------ SYSTEM STATUS REPORT ------

Wed 18-Dec-2013  10:19:16
Serial Number: 2013MD000302    In-Service Date: 12/18/13
Reference Cell Targets (V)    Reference Cell Actual (V)
--------------------------    -------------------------

Cell #1 = 0.88 V              Cell #1 = 0.879 V
Cell #2 = 0.89 V              Cell #2 = 0.889 V
Cell #3 = 0.88 V              Cell #3 = 0.000 V
Cell #4 = 0.88 V              Cell #4 = 0.000 V
Cell #5 = 0.88 V              Cell #5 = 0.867 V
Cell #6 = 0.88 V              Cell #6 = 0.843 V Channel 1 is ON               Channel 2 is ON
Channel 3 is OFF              Channel 4 is OFF Shunt 1 Full Scale = 20 A     Shunt 2 Full Scale = 20 A
Shunt 3 Full Scale = 20 A     Shunt 4 Full Scale = 20 A Anode #1 Voltage = 4.85 V     Anode #1 Current = 0.078 A
Anode #2 Voltage = 4.85 V     Anode #2 Current = 0.330 A
Anode #3 Voltage = 0.00 V     Anode #3 Current = 0.000 A
Anode #4 Voltage = 0.00 V     Anode #4 Current = 0.000 A Pulse Width Modulator Performance:
ON Time All Enabled Channels = 4.9 Seconds
CAUTION - Check Measurement Time Setting!!
Measurement Time All Enabled Channels = 4.95 seconds
Channel 1 Auto Mode - PWM %: 22.85 Limited
Channel 2 Auto Mode - PWM %: 4.26 Limited
Channel 3 is OFF
Channel 4 is OFF Current System Temperature = 21.4 C / 70.5 F
Maximum System Temperature = 32.8 C / 91.1 F
Minimum System Temperature = 9.0 C / 48.2 F
------ END STATUS REPORT ------
```

DIGITALLY CONTROLLED CORROSION PROTECTION SYSTEM AND METHOD

CROSS-REFERENCE TO OTHER APPLICATIONS

This application claims the benefit of Provisional U.S. Patent Application No. 61/789,634, the disclosure of which is herein incorporated by reference. In addition, the disclosure of U.S. Pat. No. 4,437,957 is also herein incorporated by reference.

FIELD OF THE INVENTION

The present invention relates generally to digitally controlled corrosion protection systems and methods, and, more particularly, to a system and method for independently providing corrosion protection to different regions of a protected structure, or to a plurality of different protected structures.

BACKGROUND OF THE INVENTION

A metal structure (such as an iron or iron alloy structure) which must be immersed in an electrolyte (such as water) is subjected to a significant problem: corrosion. This corrosion problem occurs due to a flow of electrical current through the electrolyte, between localized Cathodic and Anodic portions of the immersed structure.

Accordingly, in the past, a plurality of systems have been developed in an attempt to counteract this corrosion, by making the metal structure to be a protected part of an electrical arrangement which holds the structure at a predetermined electrical potential. This is accomplished by providing an electrode which is also immersed in the electrolyte, and is spaced apart from the structure to be protected.

The structure and the electrode are then coupled to terminals of differing potentials of a direct current (DC) voltage source (which in an example embodiment is a rectified alternating current (AC) voltage). Thus, the structure forms part of a circuit comprised of: the voltage source, the electrode, the electrolyte, and the structure itself. This provides a predetermined polarity of potential to the structure, in order to reduce the likelihood of the development of corrosion produced by local flow of electrical current.

If the structure is maintained at a negative potential, the system is known as a Cathodic protection system. On the other hand, if the structure is maintained at a positive potential, the system is known as an Anodic protection system. In either case, the electrode has a polarity opposite to that of the structure. Furthermore, in either case, it is desirable to maintain the structure at a predetermined potential in order to continue to prevent corrosion, since an improper potential level can reduce the effectiveness of corrosion protection, and, in some cases, actually stimulate the corrosion.

For illustrative purposes, all discussion hereinafter will relate to a Cathodic protection system wherein the structure to be protected is a cathode, and the electrode with which it cooperates is an Anode. Of course, it is understood that the system discussed herein can readily be converted to an Anodic protection system by reversing the polarities of the structure and the electrode.

In order to hold the structure at a desired potential level, e.g., at a predetermined negative potential for Cathodic protection, it is necessary to sense the potential of the structure, and make any changes necessary to the direct current (DC) source used to correct the current flow between the cathode and the Anode, in order to maintain the desired potential level. Usually, the sensing is done through the use of a Reference Cell (e.g., a standard Cu—CuSO$_4$ half cell) which is also located in the electrolyte spaced apart from the structure. This Reference Cell, which alternatively can be called a "sensor", is coupled to a measuring means (such as a voltmeter). The measuring means is also coupled to the structure.

Therefore, the measuring means can readily determine the potential of the structure. Since it is known that the potential of the structure has to remain at a certain level in order to be effective to prevent corrosion, the determination of the potential of the structure allows for control of the voltage applied between the Anode and the structure, which establishes the potential of the structure. Such control can be manual, or with an automatic analog adjuster for adjusting the direct current (DC) source coupled to the Anode and cathode.

However, existing analog corrosion protection systems have many drawbacks and limitations. For example, the corrosion protection system disclosed in U.S. Pat. No. 4,437,957, to Freeman, issued on Mar. 20, 1984, has many limitations. The analog system disclosed in Freeman can only control one Anode array for each circuit, because it is limited to monitoring only one Reference Cell. It is unable to store operating parameters, and is unable to provide time stamps for values of operating parameters. It cannot produce digital signals (digital signals are preferable to analog signals for transmission to distant locations), and cannot receive digital signals (which have many uses, including for changing operating parameters of the system).

In addition, the corrosion protection system in Freeman requires multiple meters and switches in order to record system operating parameters. It uses analog control to vary the Anode output electrical current, and requires the use of direct current (DC) for operation. Also, it cannot cause the Reference Cell to operate at an exact preset level, because analog control utilizes an error signal between the actual Reference Cell voltage and the preset desired voltage to control the Anode output electrical current. A margin of error of 25 millivolts is considered normal for the corrosion protection system disclosed in Freeman.

Moreover, a usual analog control system either samples a Reference Cell voltage when a direct current (DC) is in a zero current state, or processes the Reference Cell voltage to cancel out the effects on the Reference Cell voltage of the Anode current. In both cases, extraneous induced signals can cause errors in the measured Reference Cell voltage. This causes the analog control system to operate at incorrect current levels, and negatively affects the proper performance of the analog system.

SUMMARY OF THE INVENTION

Accordingly, it is an objective of the present invention to provide a digital corrosion protection system and method for Anodic or Cathodic protection of a structure, as an improvement over existing corrosion protection systems and methods. A further objective of the present invention includes controlling an Anode array, by monitoring and selecting at least one Reference Cell for the purpose of optimizing the output of the Anode array, for independently providing corrosion protection to different regions of a protected structure, or to a plurality of different protected structures.

An additional objective is to perform mathematical analysis on control data, in order to meet professionally accepted criteria for corrosion protection. Other objectives include: storing operating parameters, and storing operating parameters with a time stamp; producing digital signals (which are an improvement over analog signals when transmitting to distant locations); receiving digital signals (which have many uses, including for changing operating parameters of the system); automatically measuring and storing system operating parameters; and sequentially displaying system operating parameters on a digital display.

The present invention has several advantages over existing corrosion protection systems and methods. It does not require manual or analog adjustment of a direct current (DC) or rectified alternating current (AC) power supply for control, but can use pulse width modulation (PWM) control instead. It does not depend on an analog error signal to produce the current output, and therefore has more precise control than existing analog corrosion protection systems and methods. A normal difference between actual and desired Reference Cell voltages in the present invention is usually between 0 to 5 millivolts, unlike the 25 millivolt difference in some analog existing analog corrosion protection systems and methods.

In addition, the present invention allows the sample time for measuring Reference Cell voltages to be sufficiently long so as to negate any induced voltages from extraneous sources. Also, the present invention can take multiple samples, and mathematically average them in order to reduce any induced signal errors. The present invention can be remotely monitored, and system operating parameters can be remotely changed through standard digital communications techniques. In addition, operating parameters can be monitored, stored with time stamps, and transmitted to remote locations.

Also, the present invention can analyze multiple Reference Cell readings, and determine appropriate operating voltage and current outputs to optimally protect the structure or structures. The present invention can provide redundant corrosion protection systems for critical applications, so that if one corrosion protection system fails, a redundant system will automatically start to protect the structure. As a result of the above discussed features and benefits of the present invention, the present invention can provide a more accurate current output, such that Reference Cells are kept at desired voltages, and free of significant error, resulting in a better performance than in existing systems and methods.

To achieve these and other objectives, the present invention provides a system, and a method of operating thereof, including: a power supply; at least one Anode; at least one Reference Cell (alternatively referred to as "sensors"); and a digital controller configured to store measured reference voltages, to compare each measured reference voltage with a preset voltage, to apply a pulse width modulated current through the at least one Anode, to stop the pulse width modulated current, to measure and store new reference voltages, to incrementally adjust the pulse width modulated current, and to repeat the steps of comparing, applying, stopping, and incrementally adjusting until the measured reference voltages equal the predetermined voltage.

BRIEF DESCRIPTION OF THE DRAWINGS

Additional characteristics and advantages of the invention will better emerge from the detailed description that follows, of some preferred but non-exclusive embodiments, illustrated purely by way of non-limiting example in the accompanying figures of the drawings, in which:

FIG. 3 shows a Pulse Width Modulation (PWM) Regulation Scheme.

FIG. 4B shows a Table of Terminals and Connectors in the Digital Controller Circuit Description and Terminal Diagram.

FIGS. 9A, 9B, 9C, 9D, 9E, 9F, 9G, and 9H each show a Screen Display.

FIGS. 10A, 10B, and 10C show Digital Controller Console Commands.

FIG. 11 shows a Digital Controller System Status Report.

DETAILED DESCRIPTION OF THE DRAWINGS

Figure 1:
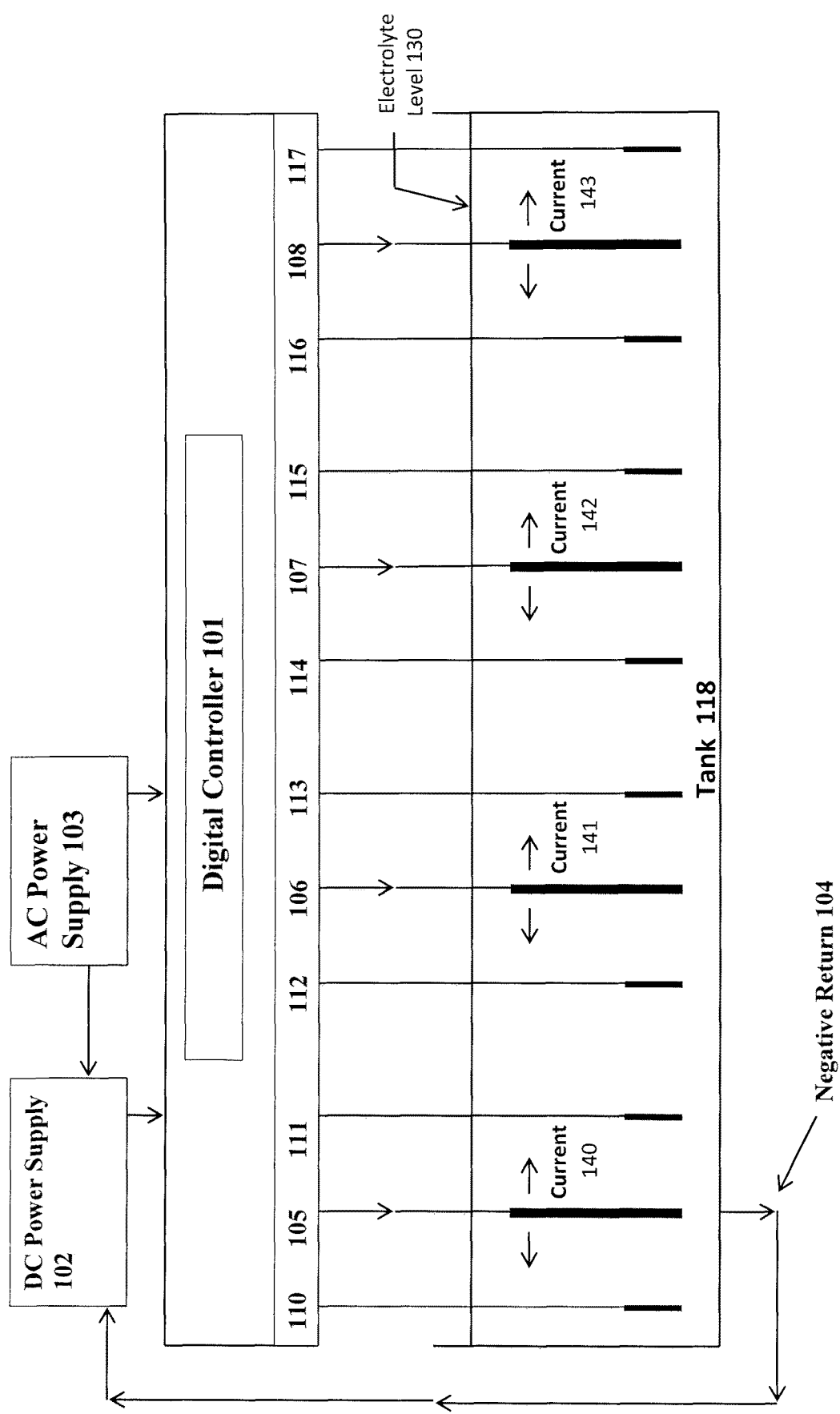
FIG. 1 shows a Corrosion Protection System for multiple areas of the same structure.

Referring now to the drawings, FIG. 1 shows an example Corrosion Protection System for multiple areas of the same structure, including Digital Controller 101; DC Power Supply 102; AC Power Supply 103; Negative Return 104; Anodes 105, 106, 107, and 108; Reference Cells 110, 111, 112, 113, 114, 115, 116, and 117; Tank 118; Electrolyte level 130; and Currents 140, 141, 142, and 143.

Figure 2:
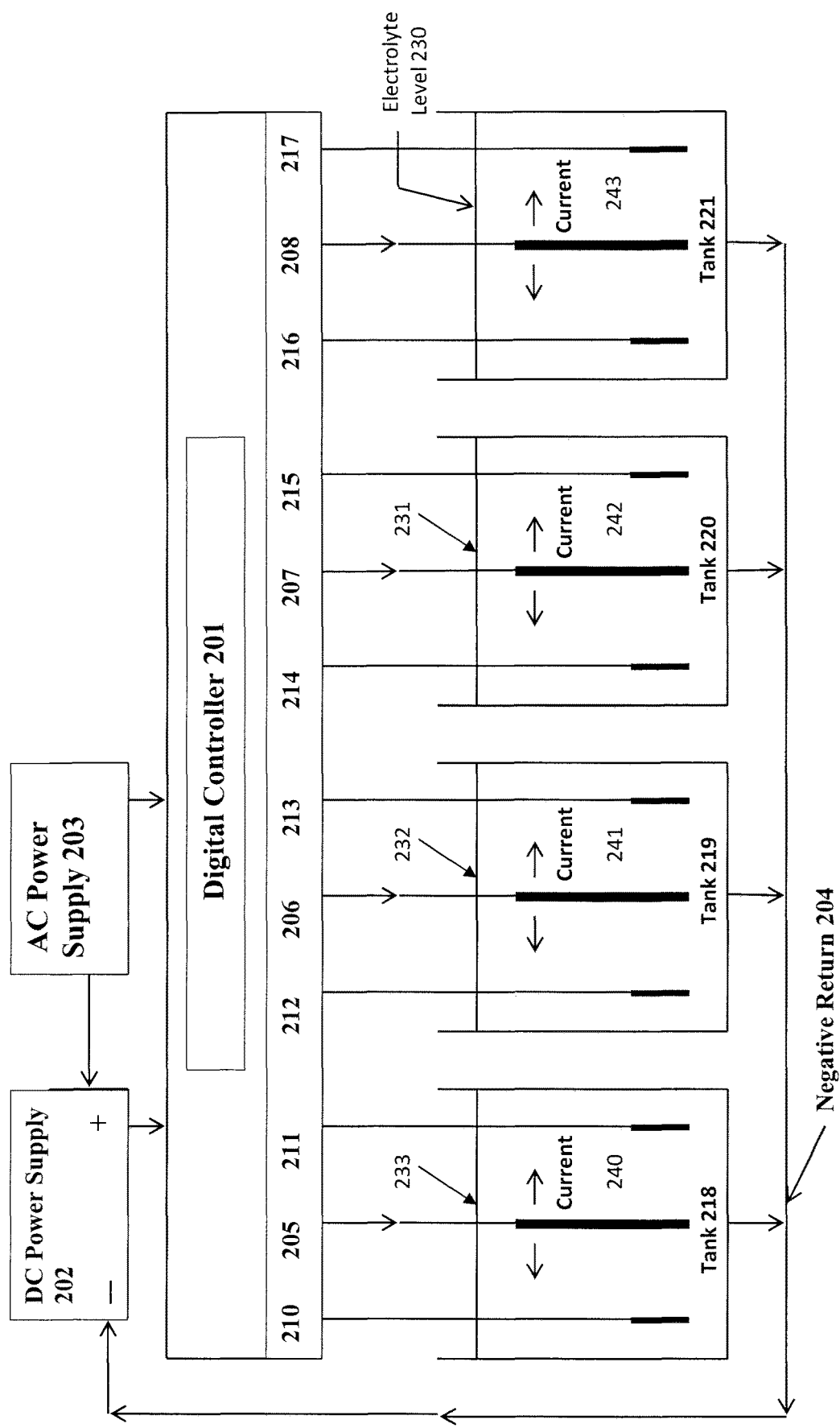
FIG. 2 shows a Corrosion Protection System for multiple structures.

FIG. 2 shows an example Corrosion Protection System for multiple structures, including Digital Controller 201; DC Power Supply 202; AC Power Supply 203; Negative Return 204; Anodes 205, 206, 207, and 208; Reference Cells 210, 211, 212, 213, 214, 215, 216, and 217; Tanks 218, 219, 220, and 221; Electrolytes 230, 231, 232, and 233; and Currents 240, 241, 242, and 243.

FIG. 3 shows an example Pulse Width Modulation (PWM) Regulation Scheme, including a System Voltage 301; Pulse Width Modulated Pulses 302, 303, and 304; ON Time 310, 311, and 312; and OFF Time 320, 321, and 322. In FIG. 3, System Voltage 301 is applied in pulses during ON Time system operation. During the OFF Times 320, 321, and 322, the voltages of Reference Cells may be measured at each cycle, or a plurality of cycles may be skipped between measurements.

Figure 4A:
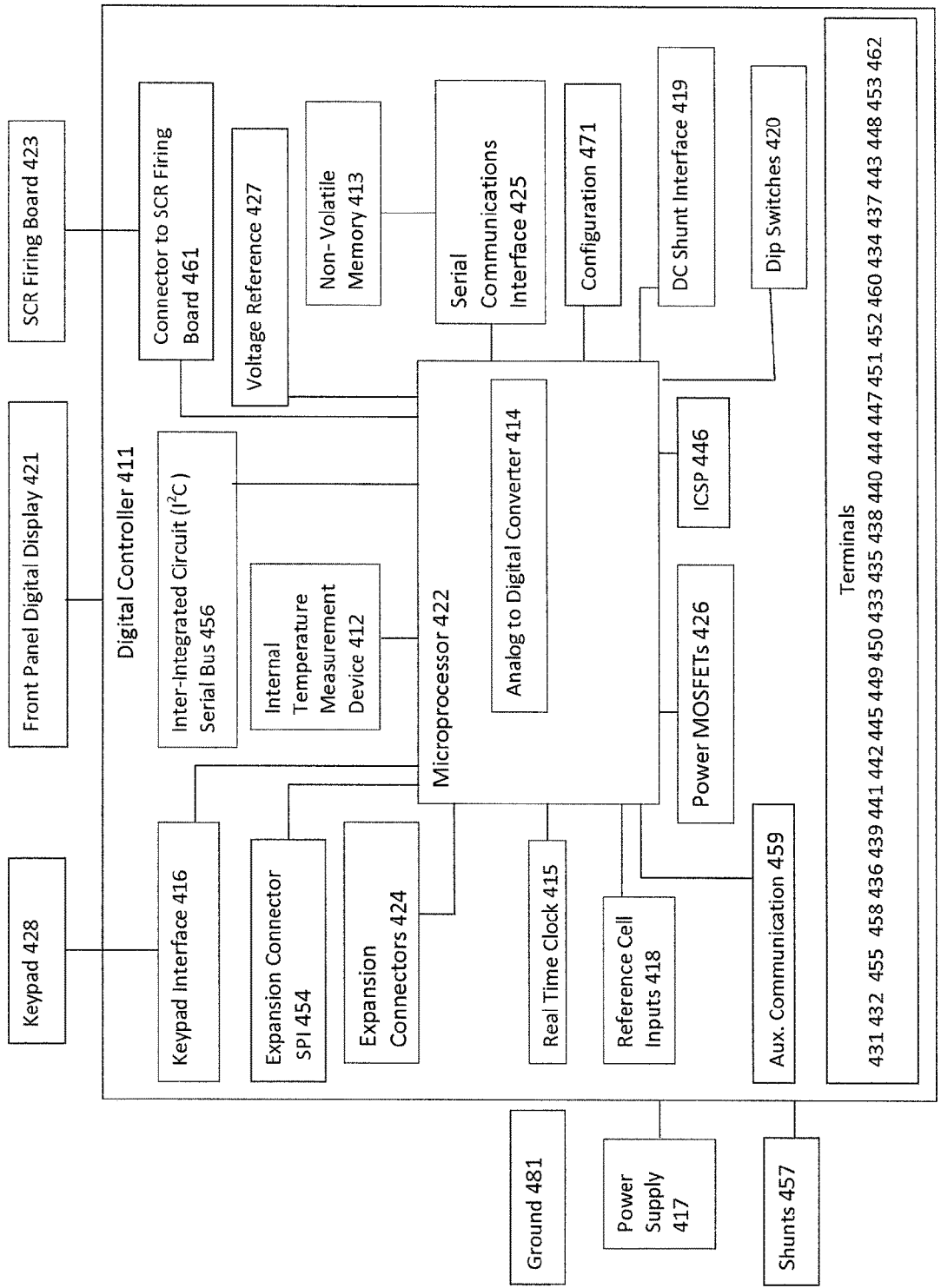
FIG. 4A shows a Digital Controller Circuit Description and Terminal Diagram.

FIG. 4A shows an example Digital Controller Circuit Description and Terminal Diagram, while FIG. 4B shows a Table of Terminals and Connectors in the Digital Controller Circuit Description and Terminal Diagram. The following paragraphs describe the various components of the system shown in FIG. 4A, and provide a brief description of how they work and their contribution to system operation.

FIG. 4A shows an example Digital Controller 411. The Digital Controller 411 includes the following components inside thereof: a Microprocessor 422 including an Analog to Digital Converter 414, an Internal Temperature Measurement Device 412, Non-Volatile Memory 413, Reference Cell Inputs 418, Voltage Reference 427, Real Time Clock 415, Expansion-Connectors 424, Serial Communications Interface 425, and DC Shunt Interface 419. Disposed outside of, but connected to Digital Controller 411 are components such as Power Supply 417, Ground 481, Keypad 427, Front Panel Digital Display 421, and SCR Firing Board 423.

Figure 5:
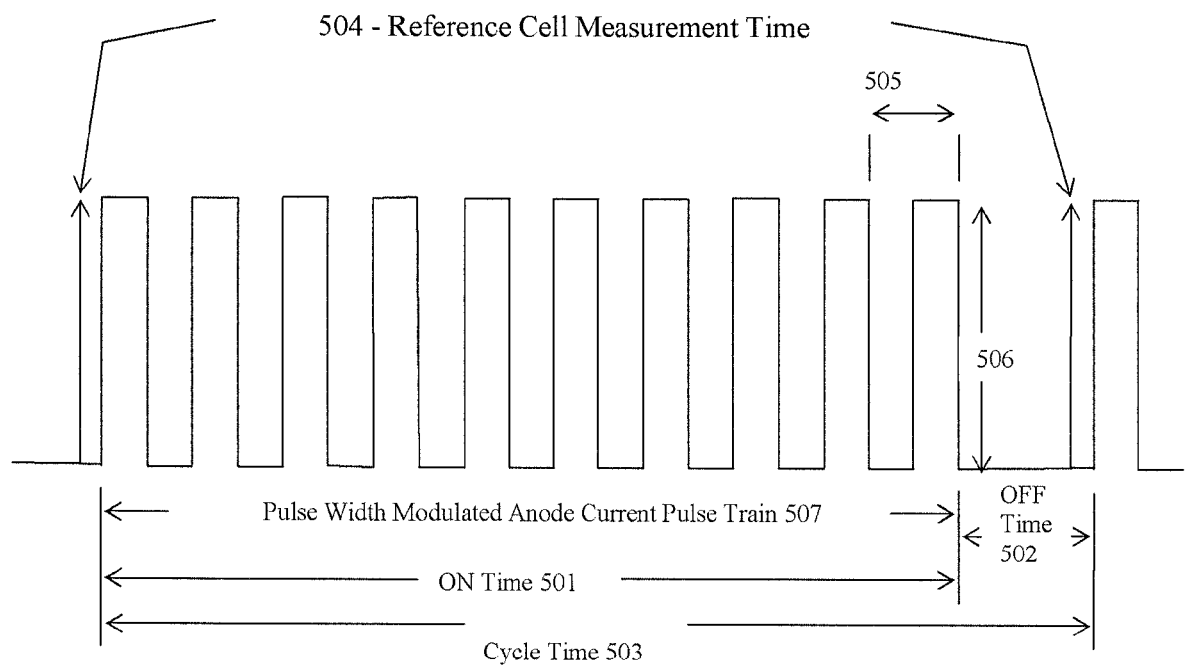
FIG. 5 shows an Operation Cycle Diagram.

FIG. 5 shows an example Operation Cycle Diagram, which includes ON Time 501, OFF Time 502, Cycle Time 503, Reference Cell Measurement Time 504, and Wavelength 505 and Amplitude 506 of Pulse Width Modulated (PWM) Anode Current Pulse Train 507. In an example embodiment, a Digital Controller 201 receives AC power from the AC Power Supply 203, DC power from the DC Power Supply 202, and controls and monitors signals from the various Reference Cells 210, 211, 212, 213, 214, 215, 216, and 217. The Digital Controller 201 is configured to monitor the control Reference Cell signals, compare them to a desired target level, and then adjust the DC output power to the various Anodes 205, 206, 207, and 208 in order to maintain the control of the relevant Reference Cells 210, 211, 212, 213, 214, 215, 216, and 217 at the target value.

As shown in the example embodiment of FIG. 5, a Digital Controller 201 operates on a continuous series of cycles. Each Cycle Time 503 consists of an ON Time 501, and an OFF Time 502. During the ON Time 501, a series of pulse width modulated (PWM) pulses with a wavelength 505 is sent from the Digital Controller 201 to the individual Anodes 205, 206, 207, and 208. The power for these pulses comes from the DC Power Supply 202, but is controlled by the Digital Controller 201.

At the end of each Cycle Time 503, during the OFF Time 502, all the relevant Reference Cell signals are measured and stored by the Digital Controller 201. There is no current flowing in any of the Anodes when the Reference Cell signals are measured by Digital Controller 201, so all Reference Cell measurements are free from "IR Drop" error.

Subsequently, the measured Reference Cell signals are compared to the target signals, and the Anode power is adjusted, if necessary, for each Anode in the following Cycle Time 503, in order to keep the respective Reference Cell signal equal to the target value. The Cycle Time 503, ON Time 501, OFF Time 502, Measurement Time 504, and Wavelength 505 are all variables that are controlled by the Digital Controller 201. If a controllable variable voltage DC power supply is used, the Digital Controller 201 provides a control signal to control the voltage of the variable voltage power supply.

Figure 6:
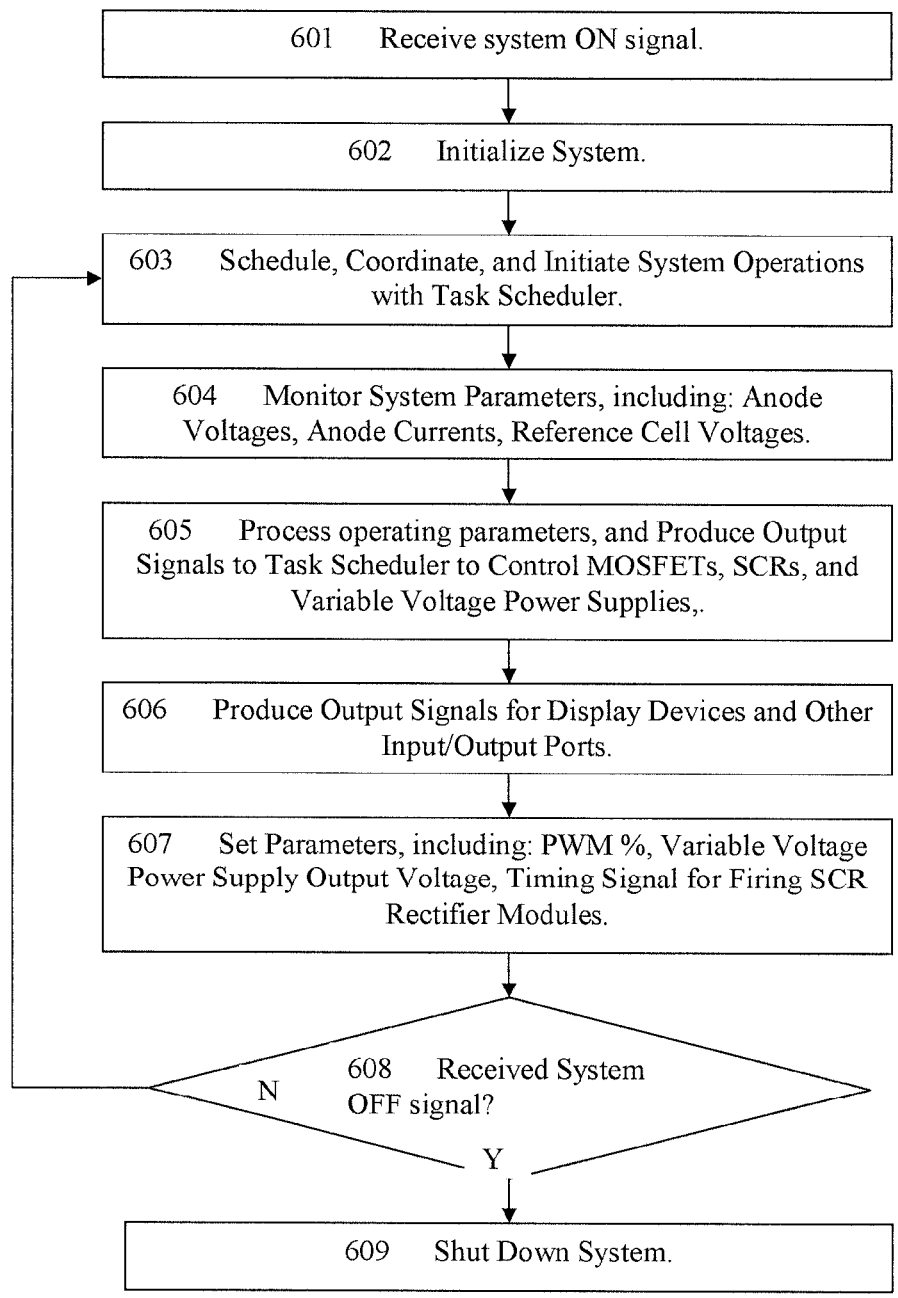
FIG. 6 shows a Digital Controller Flow Chart of a Digital Control Method.

FIG. 6 shows an example Digital Controller Flow Chart of a Digital Control Method. The method includes the following steps: Receive system ON signal (step 601); Initialize system (step 602); Schedule, coordinate, and initiate system operations with Task Scheduler (step 603); Monitor system parameters, including: Anode voltages, Anode currents, Reference Cell voltages (step 604); Process operating parameters, and produce output signals to control the Metal-Oxide-Semiconductor Field-Effect Transistors (MOSFETs), Silicon-Controlled Rectifier (SCRs), and Variable voltage power supplies, with Task Scheduler (step 605); Produce output signals for display devices and other input/output ports (step 606); Set parameters including: Pulse Width Modulation Percentage (PWM %), variable voltage power supply output voltage, timing signal for firing Silicon-Controlled Rectifier (SCR) modules (step 607); and an inquiry (step 608) as to whether or not the system has Digital Controller has received an OFF signal. If the response to step 608 is "YES", it is followed by Shut down system (step 609). Otherwise, the answer is NO, and steps 603 through 608 are repeated.

Figure 7:
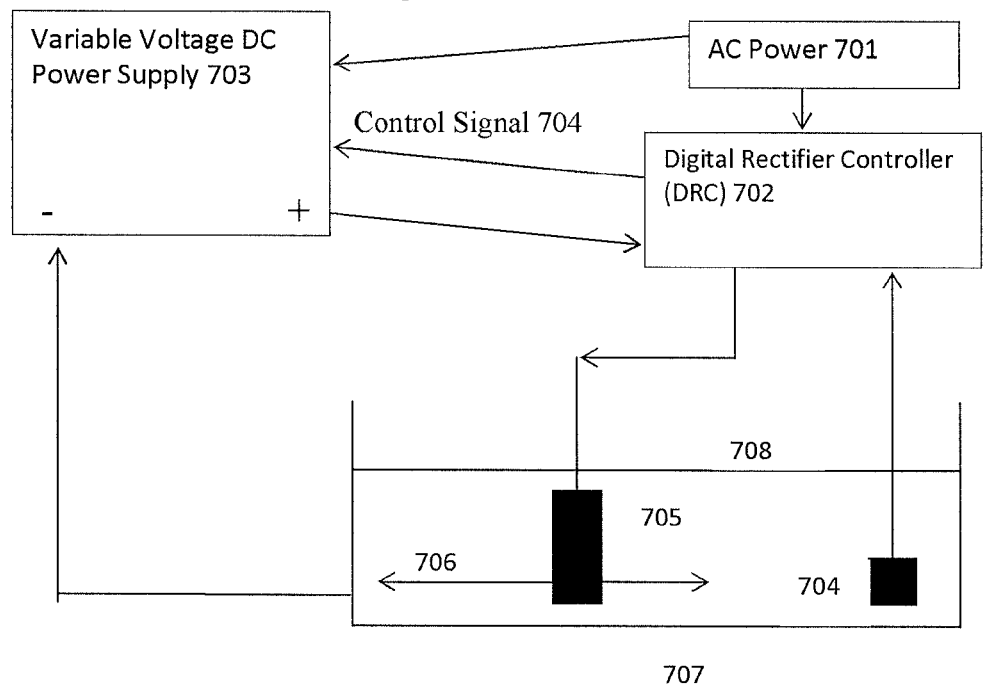
FIG. 7 shows a structure that uses a variable voltage DC power supply, and is filled with an electrolyte.

FIG. 7 shows an example structure (Tank 707) filled with an Electrolyte 708, as well as a Variable Voltage DC Power Supply 703, whose Voltage is controlled by a Control Signal 704 from Digital Rectifier Controller (DRC) 702, and also Reference Cell 704, Anode 705, and Electrical Current 706.

Figure 8:
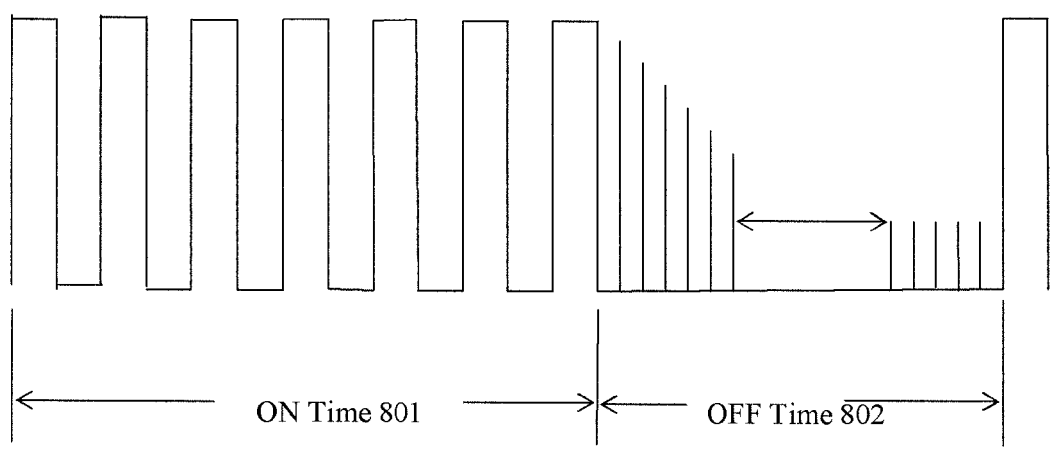
FIG. 8 shows a Depolarization Measurement Diagram.

FIG. 8 shows an example Depolarization Measurement Diagram. ON Time 801 includes a train of Pulse Width Modulated (PWM) Anode current pulses. OFF Time 802 includes a train of polarization measurements.

Figure 9A:
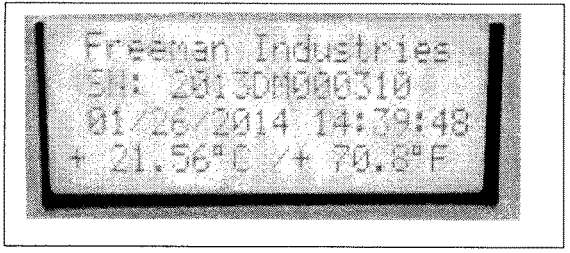
Figure 9B:
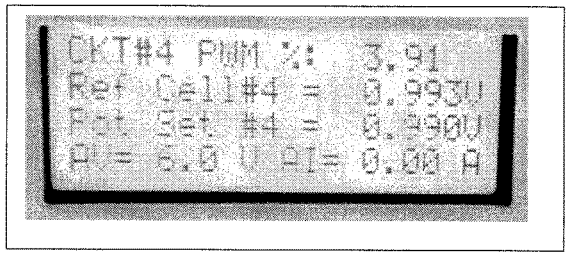
Figure 9C:
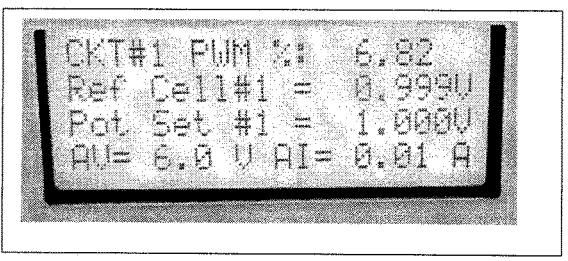
Figure 9D:
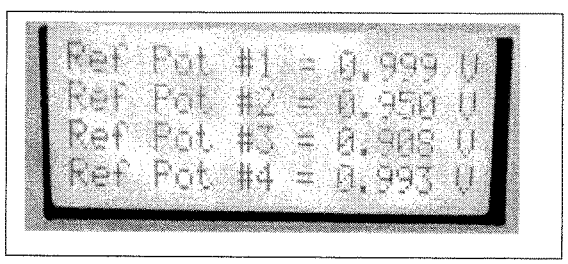
Figure 9E:
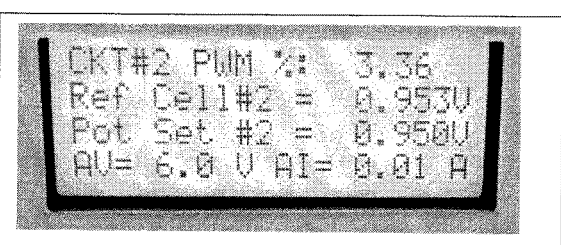
Figure 9G:
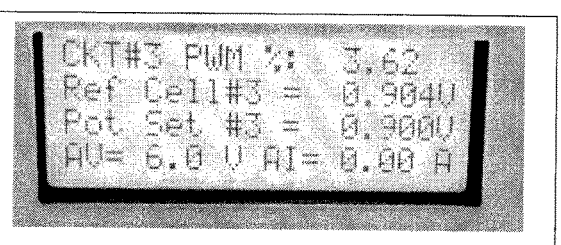
Figure 9H:
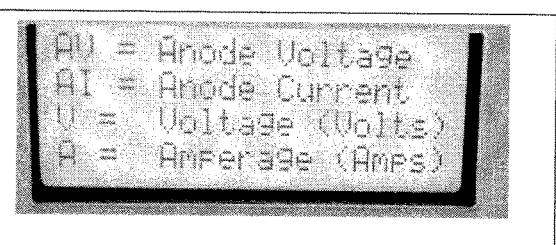

FIGS. 9A, 9B, 9C, 9D, 9E, 9F, 9G, and 9H each show an example Screen Display. FIG. 9A shows a manufacturer name (Freeman Industries), a Serial Number (SN), date, time, and temperature in both Celsius and Fahrenheit. As shown in FIGS. 9F and 9H, the abbreviations shown in FIGS. 9B, 9C, 9D, 9E, and 9G include the following: Circuit (CKT), Reference (REF), Potential (POT), Pulse Width % (PWM), Anode Voltage (AV), Anode Current (AI), Voltage in Volts (V), and Amperage in Amps (A).

FIG. 10A shows an example list of Operator Reporting Commands 1001, which the user can input into the Digital Controller in order to obtain a display of data from the Digital Controller. These Operator Reporting Commands include: Print Command List (?); Print Ambient Temperature (AT), Print Anode Voltage (AV#, wherein # has a value of 1 through 4); Print Cell Voltage (C#, wherein # has a value of 1 through 6); Enable/disable reference cell 5 reading (C5X, wherein X has a value of 1 or 0); Enable/disable reference cell 6 reading (C6X, w herein X has a value of 1 or 0); Print Pulse Width Modulator Duty Cycles (DC); Display Measurement Time (DMT); Print System Report/Print All (PA); Print Real-Time Clock Calibration Register (PC); Print DIP Switch Setting (PD); Print Service Date (PSD); Print Serial Number (PSN); Print Shunt Current (SH#, wherein # has a value of 1 through 4); Print time from Real-Time Clock (T); and Print Firmware Version Number (VER). Set Real-Time Clock Time (SMMDDYYHHMMSSDOW). Example: MM=month, DD=day, YY=year, HH=hour, MM=minute, SS=seconds, and PSN); Print Shunt Current (SH#, wherein # has a value of 1 through 4); Print time from Real-Time Clock (T); and Print Firmware Version Number (VER).

FIG. 10B shows an example list of System Setup Commands 1002, which the user can input into the Digital Controller in order to set parameters of the Digital Controller. These System Setup Commands include: Set Channel X to Auto Mode (AUTOX), which Cancels Manual Mode. Example: AUTO1. Set Cycle Time (CT followed by 2 digits). Example: CT40. Clear Min/Max Temperatures (CTEMP). Initialize the LCD Display (DI). Set max limit for PWM Duty Cycle for Channel X at YY % (LXYY). Example: L145. Clear PWM Limit for Channel X (LCX). Example: LC1. Set Channel X to Manual Mode with Duty Cycle YY (MANXYY). Example: MAN135. Set Measurement Time (MT, followed by amount of time). Example: MT495 (wherein MT is 4.95 seconds). Set Cell X Target at Voltage YYY (RCXYYY). Example: RC1085 (wherein X=Cell 1, and YYY=0.85V). wherein (DOW 1=SUN). Set Real-Time Clock Calibration Register (SC). Example: SC04. Set Channel PWM Duty Cycle (SDC###). Example: SDC145, wherein the values 145 represent Channel 1 and 45%. Set DC Shunt (1-4) Full Scale (SHFS###). Example: SHFS105, wherein 1 represents Shunt1, and 05 represents 5A. Start Real-Time Clock (SRTC). Set Service Date—6 digits (SSDMMDDYY). Example: SSD053012 (wherein the date is represented in MMDDYY format). Set Serial Number—12 digits (SSN). Example: SSN2013MD000300.

FIG. 10C shows an example list of System Test Commands 1003, which the user can input into the Digital Controller in order to initiate a test by the Digital Controller.

These commands include the following. Short depolarization measurement on channel X (POLX). Example: POL1. One minute depolarization measurement on channel X (POLMX). Example: POLM1. One hour depolarization measurement on channel X (POLHX). Example: POLH1. Short depolarization with Excel compatible output (EPOLX). Example: EPOL1. One minute depolarization with Excel compatible output (EPOLMX). Example: EPOLM1. One hour depolarization with Excel compatible output (EPOLHX). Example: EPOLH1.

FIG. 11 shows an example Digital Controller System Status Report which is output by the Digital Controller in response to a request by a user. The data in the Status Report includes: Date, Time, Serial Number, In-Service Date, Reference Cell Targets (in Volts) and Reference Cell Actual (in Volts) for each Reference Cell. In addition, the Status Report includes: info for each Channel as to whether it is ON or OFF, the Full Scale Current (in Amperes) for each Shunt, and the Voltage (in Volts) and the Current (in Amperes) of each Anode.

The Status Report in FIG. 11 also includes Pulse Width Modulator Performance, including: ON Time All Enabled Channels (in Seconds), Measurement Time All Enabled Channels (in Seconds), Pulse Width Modulation Percentage Limit (PWM %) for each Channel in Auto Mode, Current System Temperature (in both ° C. and ° F.), Maximum System Temperature (in both ° C. and ° F.), and Minimum System Temperature (in both ° C. and ° F.).

Figure 12:
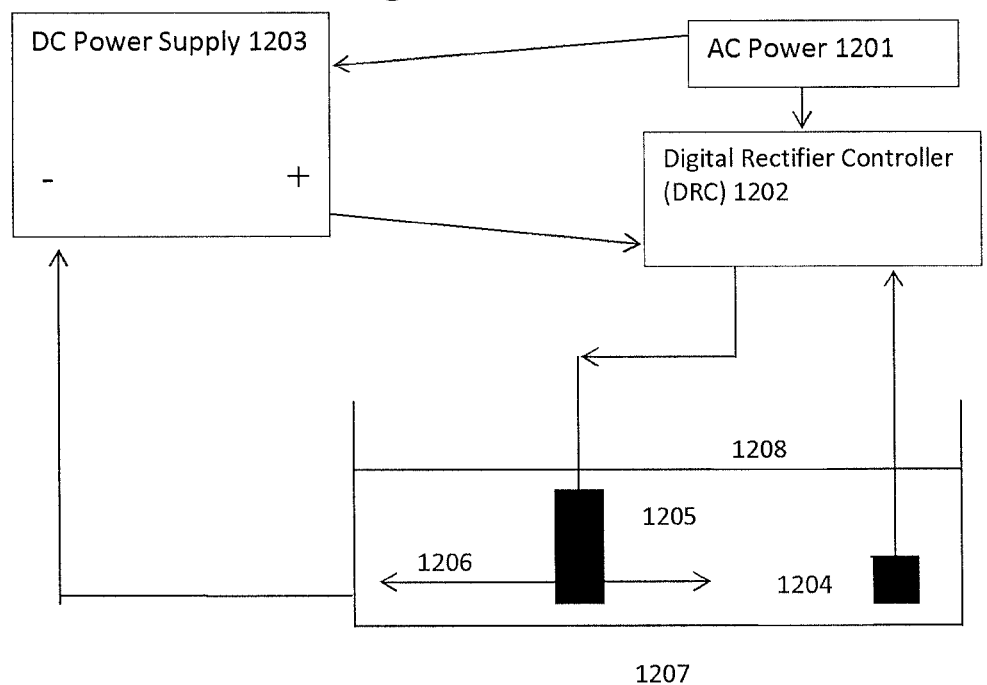
FIG. 12 shows an structure that uses a fixed DC power supply, and is filled with an electrolyte.

FIG. 12 shows an example structure (Tank 1207) filled with an Electrolyte 1208, Digital Rectifier Controller (DRC) 1202, a fixed DC Power Supply 1203, Reference Cell 1204, Anode 1205, and Electrical Current 1206. FIG. 12 differs from FIG. 7 in that a fixed DC Power Supply 1203 is used instead of a Variable Voltage DC Power Supply 703, which eliminates the need for a Control Signal 704 from the Digital Rectifier Controller (DRC) 1202.

Figure 13:
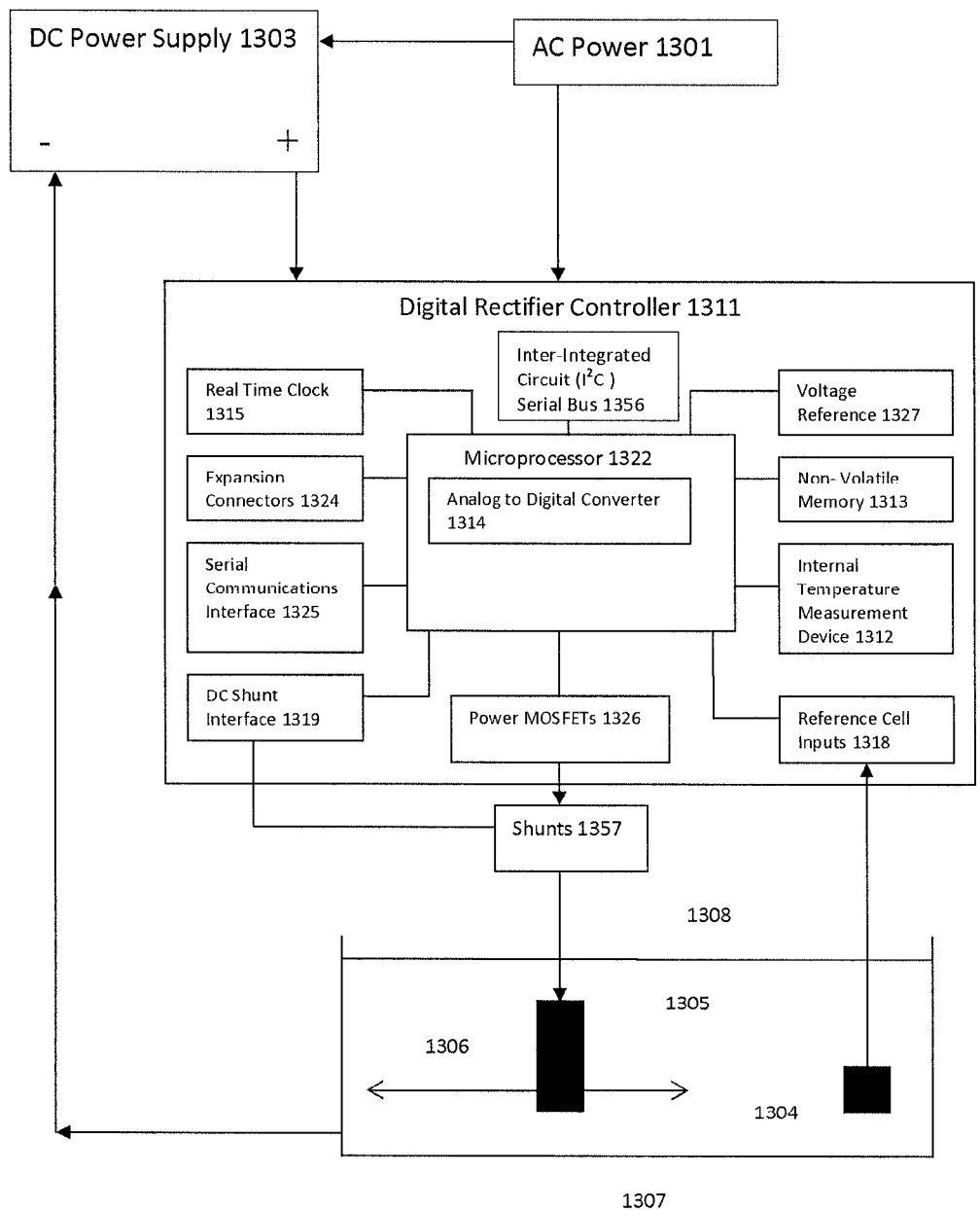
FIG. 13 shows another structure that uses a DC power supply, and is filled with an electrolyte.

FIG. 13 shows an example structure (Tank 1307) filled with an Electrolyte 1308, Digital Rectifier Controller (DRC) 1311, an AC Power Supply 1301, a fixed DC Power Supply 1303, Shunts 1357, a Reference Cell 1304, Anode 1305, and Electrical Current 1306. Inside Digital Rectifier Controller (DRC) 1311 are a Microprocessor 1322 including an Analog to Digital Converter 1314, an Internal Temperature Measurement Device 1312, Non-Volatile Memory 1313, Reference Cell Inputs 1318, Voltage Reference 1327, Real Time Clock 1315, Expansion-Connectors 1324, Serial Communications Interface 1325, DC Shunt Interface 1319, and Power MOSFETs 1326.

DETAILED DESCRIPTION

One of the key issues in system design is getting the hardware and the firmware to work together properly. The combined system must perform the desired function in the end. In this case, the purpose of the system is to provide current flow in a Cathodic protection system, to an extent that the structure in the protected system does not corrode.

In the present invention, the system is connected to a power supply that typically provides 12 volts DC to the system, and the Digital Controller is required to properly regulate the current flow in the system to provide maximum corrosion protection to the system within required parameters without over charging the system.

FIG. 1 depicts a structure (Tank 118) that is protected by an example embodiment of the invention. At the top right of the graphic is the AC Power Supply 103, which supplies power to the DC Power Supply 102 as well as the Digital Controller 101. In the example embodiment, the Digital Controller 101 has four Anode outputs 105, 106, 107, and 108. In series with the Anode leads (and not shown in the diagram) are millivolt Shunts that feed a DC voltage representative of the Anode current back to the Digital Controller. The voltages provide the Digital Controller with the ability to directly measure the current flowing in the Anode leads.

Also shown in FIG. 1 are Reference Cells 110, 111, 112, 113, 114, 115, 116, and 117 used to indicate the state of the overall system. The Digital Controller uses the Reference Cells to determine if enough electrical Current 140, 141, 142, and 143 is flowing in the Electrolyte 130 (in the monitored areas of the system) to properly protect the structure. The Digital Controller passes current through the system, via the Anode outputs 105, 106, 107, and 108, for a period of time. At a selected time, the Digital Controller switches the current OFF and waits briefly for transient artifacts to decay and then measures the Reference Cell voltages. If the voltage is too high, the Digital Controller will adjust the Pulse Width Modulation (PWM) control to lower the Duty Cycle of the MOSFET switches. Conversely, if the Reference Cell voltage is too low, the PWM Duty Cycle is increased.

The desired Reference Cell voltage is user programmable using a user interface, and is user selectable from a list of available values. The selected desired Reference Cell voltage is also known as the "Target Voltage". The objective of the Digital Controller is to regulate each Reference Cell voltage so as to match a respective Target Voltage selected by a user. The Digital Controller attempts to do so by controlling the current flow from the Anodes, by using the gated PWM signals to the MOSFET gates. Target Voltages are a subset of the operating parameters stored in non-volatile memory, and are also reported in system performance reports.

A Cathodic protection system may also be simultaneously applied to multiple structures, as in the example embodiment shown in FIG. 2. The example embodiment in FIG. 2 shows a plurality of protected structures (shown as four different Tanks 218, 219, 220, and 221). Each Tank has its own respective Anode and Reference Cells (e.g., Tank 218 has Anode 205 and Reference Cells 210 and 211. Each tank also has its own Electrolyte (e.g., Tank 218 has Electrolyte 233) which may or may not be different from the Electrolytes in other Tanks. The Digital Controller 201 controls each of these systems independently. The Digital Controller simply passes current into the individual Anodes with the aim of regulating each current so that the Reference Cells in each tank are maintained at its own respective Target Voltage. Each Reference Cell may be set to a different target, and each Anode may have a different Shunt rating to match current flow requirements.

In addition, the Digital Controller has the ability to utilize different Anode voltages split between different Channels (e.g., two different Anode voltages, split respectively between Channels one and two and Channels three and four). This means that the set of channels one and two can be operated at 12 volts, while the set of channels three and four is operated at 24 volts, independently from the set of channels one and two. This allows flexibility in setting up corrosion protection systems to accommodate a variety of requirements. For example, in the embodiment shown in FIG. 2, Anodes 205 and 206 could be at Channels one and two respectively, while Anodes 207 and 208 could be at Channels three and four respectively.

One essential element of the Cathodic protection system operation is a user interface. Example user interface components are Keypad 428 and Front Panel Digital Display 421 shown in FIG. 4A. By using a user interface, a user is able to request information from the system, such as operating parameters, or can set a variety of parameter values inside the system. For example, a user can select from a plurality of desired parameter values for each Reference Cell, and can set what size DC Shunts are being used in each channel by the system.

The user interface uses an internal Universal Synchronous Asynchronous Receiver Transmitter (USART) disposed inside the Microprocessor 422, that provides serial communications to the "outside world". The USART is connected to a Serial-to-USB Converter that handles enumeration and communications to a connected computer. A user can also request other functions by issuing commands to the Digital Controller. An example list of commands which can be changed with firmware changes are shown in FIGS. 10A, 10B, and 10C.

A user may also request, through the user interface, a system report by issuing the "PA" or Print All command to the Digital Controller. This report provides information about a larger plurality of system operating parameters. An example of a system report can be seen in FIG. 11.

A part of a user interface is the Front Panel Digital Display 421 as shown in FIG. 4A on the front of the system. This display panel is utilized to display system information to an observer, so that basic information about system is obtained without the need to connect a laptop or PC.

FIGS. 9A, 9B, 9C, 9D, 9E, 9F, 9G, and 9H show examples of display results presented on Front Panel Digital Display 421 during system operation. In an example embodiment, the Digital Controller is configured to scroll the information displayed on the Front Panel Digital Display 421 after a predetermined amount of time (e.g., every 10 seconds). The type of information displayed may be changed by modifying the system program as desired. In an example embodiment, the display operates continuously while the system is powered.

The Cathodic protection system operates as a closed loop regulator. In an example embodiment, the Anode current is controlled by high speed MOSFETs that switch each channel ON and OFF at a rate of approximately 240 kHz. See FIGS. 3, 5, and 8.

In an example embodiment, during each electrical half-cycle, the Microprocessor 422 operates the MOSFETs for a portion of that half cycle calculated by the regulator function in each Channel task. The loop is closed using the voltage produced by the Reference Cells. If the Reference Cell voltage is too low, the ON Time or Duty Cycle of the PWM signal is increased. Also, the duration of each PWM pulse train can be varied if further regulation control is required. Thus, the output from the MOSFETs into the system Anodes appears similar to the waveform shown in FIGS. 3, 5, and 8.

FIGS. 3, 5, and 8 show example embodiments of basic timings diagrams of the overall system operation. The top part of the Figures show the system power supply voltage (in this case 12 volts, but the voltage can be any voltage that may be desired up to about 60 volts) that is used to pass current into the Anodes, through the conducting medium (usually water) and on to the structure in the protected system. That voltage is regulated by using the pulse width modulator (PWM) in the Microprocessor 422, which applies a pulse train to the gates on the MOSFETs. The pulse train is rapidly witches the MOSFET ON and OFF.

By varying the width and overall duration of the pulses, the current flowing into the system Anodes is controlled as desired. When the Duty Cycle and the ON Time of the pulse train is varied, this affects the average current flowing into the Anode system, since a lower Duty Cycle supplies less current to the system. Conversely, a high Duty Cycle increases the average amount of current.

FIGS. 3, 5, and 8 also show examples of pulses that are generated by the Microprocessor 422 in conceptual form (not to scale). These pulses are timed to begin on the rising edge of the 60 Hz reference signal, and to stop at a time calculated by the Microprocessor 422, based on the Reference Cell voltage read by the Analog-to-Digital Converter 414 in the Microprocessor 422.

These pulses may vary in width and duration time depending on the requirements determined by measurements made by the Microprocessor 422. The pulse train repetition rate in an example embodiment is 240 Hz, but this may also vary depending on the needs of the system. The 60 Hz timing waveform is used as a convenient method to provide standard timing to the system. Other methods are acceptable, including using the internal timers in the Microprocessor 422, or perhaps with an external time base.

The preferred method to measure some of the voltages requires that the measurements be taken while the entire system is not producing any pulse trains on any of the channels. While current is flowing in the system, the Reference Cell voltage is directly affected, and if a Reference Cell is read during this period, this will produce erroneous results.

Measurement can be accomplished during the OFF Time (when PWM pulses are not being generated during each 60 Hz half cycle). This is easiest in an embodiment with a single Anode. In an alternative embodiment, the system stops generating pulses every few seconds, on a regular basis (e.g., the system stops generating pulses every five seconds, for a period of one second or less) in order to allow the system to briefly stabilize, and then accurate measurements may be taken. The time between measurements may also vary as desired.

When the Anode current is measured, it is required that the MOSFETs be ON, since the current reading is zero when the MOSFETs are OFF. Since the instantaneous current is not the average current flowing in the system, the current read must be adjusted for the current Duty Cycle. The Microprocessor 422 factors that fact into the calculation to provide an accurate representation of the average current flowing in each Anode system.

Further in Regards to FIG. 4A

Further in regards to FIG. 4A, the following paragraphs provide additional discussion of system components shown in FIG. 4A.

Power Supply 103 or 203 or 417

An example embodiment of the Power Supply 417 is switching regulator type AC power supply that utilizes 120 Volts (AC) and 60 Hz power (that is standard, for example, in the United States) that is transformer isolated. The power supply uses a step down transformer along with a primary fuse and protective metal oxide varistors to reduce potential damage from incoming voltage transients. The power supply also uses a common mode choke on the secondary side of the transformer to reduce conducted electro-magnetic interference both into and out of the system. The output of power transformer is rectified by four diodes that form a full-wave bridge rectifier. The output of the Digital Controller 411 is filtered by capacitors before being applied to the main switching regulators.

The rectified and filtered power is then presented to two switching regulators. The first regulator supplies the main 5 volt power to the system. The second switching regulator supplies +15 volts that is used to drive the gates of the Power MOSFETs 426. The Power MOSFETs 426 require a slightly higher gate voltage than is supplied by the main regulator to properly saturate them when conduction is desired, so +15 volts is made available for the MOSFET gate drivers.

Also connected to the output of the 5 volt switching regulator is a 3.3 volt linear regulator used to provide power to the core logic of the Digital Controller 411 and to several peripheral integrated circuits. The switching regulators and the linear regulator enable the power supply system is to supply +5V, +15V and +3.3V to the system.

Resistors and a clamp diode are also a part of the power supply system. The resistors and clamp diode provide a current limited and voltage clamped AC voltage to a comparator inside the Microprocessor 422 that converts the 60 Hz AC input into a 60 Hz square wave whose edges are used to provide timing reference to the system. In turn, the Microprocessor 422 uses these edges to mark the beginning of the 60 Hz AC cycle. Switching of the MOSFETs and an optional Silicon-Controlled Rectifier (SCR) control timing is based on this reference square wave. When the comparator generates an edge of the square wave an interrupt is sent to the Microprocessor 422 interrupt processor which interrupts what the Microprocessor 422 is doing to count time or for other functions.

Microprocessor 422

An example embodiment of the Microprocessor 422 used in the system is a Microchip Technology Inc.® Model PIC32MX575F512L 32-bit Microprocessor, which is used to perform all control and computational functions for the system. This Microprocessor has a plurality of internal peripherals that are used in system operations. The peripherals and their operation will be described elsewhere in this description, in regards to a method.

In order to properly operate the Microprocessor 422, a clock 415 is required in order to provide a clock signal that steps the Microprocessor through each instruction in the operating program. In an example embodiment, the clock 415 is an 8 MHz oscillator that provides the necessary clock signal to the Microprocessor. Systems internal to the Microprocessor divide the clock signal by two, and then multiply the clock signal by 20 using an internal phase locked loop, so that the Microprocessor core operates at 80 MHz. The relatively high clock speed, plus other features internal to the Microprocessor (such as a 5-stage instruction pipeline) makes the Microprocessor a very high performance device.

A plurality of external components are directly connected to the Microprocessor 422, and take advantage of the communications capabilities of the Microprocessor in order to transfer information to and from the Microprocessor, as required. These will be described immediately below, and in regards to a method, as appropriate.

Dc Shunt Interface 419 and Shunts 457

In an example embodiment, the Digital Controller 411 uses external precision Shunts 457 located between the Power MOSFETs 426 and the Anodes 105, 106, 107, and 108 (or 205, 206, 207, and 208) in the corrosion protection system, in order to measure a Current flow 140, 141, 142, and 143 (or 240, 241, 242, and 243) to the Anodes. Each MOSFET channel has an associated Shunt used to measure current flow. In an example embodiment, the output from the Shunts 457 has a maximum value of 50 millivolts when current flowing through the Shunt is at its rated value.

For example, if a Shunt 457 being used is a 20 ampere Shunt, when 20 amperes are flowing through the Shunt, the sensing terminals of the Shunt will provide 50 millivolts to the Shunt amplifiers. This voltage must be amplified in order to bring it up to a level usable by the Analog to Digital Converter 414 on the Microprocessor 422. In an example embodiment, integrated circuits (e.g., DC Shunt Interface 419) are used that act as Shunt Amplifiers with a multiplication factor of 60.

When using these Shunt Amplifiers, when a Shunt is providing full scale output of 50 millivolts, a resulting 3 volts is presented to the Analog to Digital Converter 414. This is near the full scale rating of the Analog to Digital Converter 414, thereby allowing better current measurement resolution. This voltage is clamped by Schottky diodes to prevent the voltage presented to the Analog to Digital Converter 414 in the Microprocessor 422 from exceeding its rated voltage of 3.3 volts. These Shunt Amplifiers also provide electrical isolation from the external power supply voltage (which can be as high as 30 volts).

The Shunt inputs to the amplifiers are also connected to a shunt connector, thereby providing a means to access the raw Shunt voltage for independent measurement by an external voltage measurement system. This enables a user to directly measure the Shunt voltages.

Reference Cell Inputs 418

In an example embodiment, the Digital Controller 411 is equipped with six Reference Cell inputs, and an external input connector (Inter-Integrated Circuit ($I^2C$) Serial Bus 456) for additional Reference Cell channels, if needed. These inputs are used to measure a reference voltage between the Reference Cell and the protected structure. The purpose behind Reference Cell voltage measurement is described elsewhere in this document. These inputs are switched using reed relays (relay coils), which allow for isolation of each individual Reference Cell from the system when required.

When a Reference Cell reading is needed, the Microprocessor 422 activates an associated relay coil, thereby momentarily closing the contacts of the Reference Cell. When the contacts are closed, the Reference Cell being measured is connected to a buffer amplifier, and then to the Analog to Digital Converter 414 of the Microprocessor 422. The Reference Cell voltage measurement is taken by the Analog to Digital Converter 414 of the Microprocessor 422 while the relay is closed.

When the measurement is completed, the relay is de-activated, and the system performs necessary adjustment actions depending on the voltage that was measured. If required, an additional relay is used to isolate the Digital Controller 411 from the protected structure. Normally the additional relay is continually activated, and functions to keep the system attached to structure ground.

The Reference Cell relays are switched by using individual I/O port lines from the Microprocessor 422 which are buffered by a power driver IC, that is used to switch the relay coils and is designed to handle the current requirements of the relays as well as switching the inductive load offered by the relay coils. The voltage from the Reference Cells, after being switched by the relays, is buffered by an operational amplifier and presented to the Analog to Digital Converter 414 in the Microprocessor 422.

Serial Communications Interface 425

In an example embodiment, the Digital Controller 411 is provided with a Serial Communications Interface 425 that connects a Universal Serial Bus (USB) port of an external computer, such as a laptop, to one of the internal serial communication Universal Asynchronous Receiver Transmitters (UARTs) inside Microprocessor 422. The serial interface can communicate at each of a plurality of serial communication speeds, each of which has a different baud rate. A plurality of standard baud rates may be set in the system. A popular standard baud rate is 19,200 baud.

The serial interface enables a user to set operating parameters, such as Shunt ratings and Reference Cell Target Voltages, and also to receive reports from the system detailing operating parameters such as: currents, voltages, MOSFET ON Times, system service date, serial number and additional operating parameters and system information. To communicate with the system, the user connects a USB cable to the system using a connector adapter connected to a USB terminal 458, and uses a standard terminal emulation program such as HyperTerminal to send and receive data to and from the system.

Internal Temperature Measurement Device 412

In an example embodiment, the system is equipped with an Internal Temperature Measurement Device 412 that is configured to report the current circuit board temperature, and also to report the maximum and minimum internal temperature experienced by the Digital Controller 411. This can be useful for problem diagnosis or other temperature related information. Temperature readings are obtained from the Internal Temperature Measurement Device 412 via the Inter-Integrated Circuit (I²C) Serial Bus 456 inside the Digital Rectifier Controller 1311, and can be reported to the Front Panel Digital Display 421 or via the USB terminal 458.

Non-Volatile Memory 413

In an example embodiment, the Digital Controller 411 uses the Non-Volatile Memory 413 to store controller settings and data in such a manner that the data remains viable even if power is removed from the system. Non-Volatile Memory 413 also uses the Serial Communications Interface 425 to transfer data back and forth from the Microprocessor 422 to the Non-Volatile Memory 413. On power up the system firmware reads settings and data from the Non-Volatile Memory 413 and uses it to restart the system to its last known operational state.

Front Panel Display 421

In an example embodiment, the Digital Controller 411 is equipped with a Front Panel Digital Display 421, which in an example embodiment is a Liquid Crystal Display (LCD) character display module that displays information for the system. The Front Panel Digital Display 421 is connected to the parallel master port of the Microprocessor 422, which sends commands and data to the Front Panel Digital Display 421 so that information relating to system operation is displayed in a format that a user can easily read. The Front Panel Digital Display 421 can display data from each MOSFET channel such as current, voltage, Reference Cell voltages, date, time, temperature and many other parameters. The data displayed on the Front Panel Digital Display 421 can be changed at will by changing the system program to display the desired parameters.

Analog to Digital Converter 414, and Voltage Reference 427

In an example embodiment, in order to make an accurate conversion of analog signals from such sources as from 50 millivolt Shunts 457 or from the Reference Cell Inputs 418, the Analog to Digital Converter 414 requires an accurate reference voltage to make comparisons against. The accurate voltage needed for the system is provided by the Voltage Reference 427, which is an accurate 3.3 volt source that the Analog to Digital Converter 414 uses as the reference for its voltage conversions. This allows the system to measure voltages and currents accurately. Those measurement results are then used by the Microprocessor 422 to make control decisions for the system.

Real Time Clock 415

In an example embodiment, the system uses a Real Time Clock 415, along with its associated components, to enable the system to keep track of time with reasonable accuracy. The time data is used to time stamp reports, to report the date and time when certain incidents occur and for other general reporting information that requires time related information. The Real Time Clock 415 is maintained when power is OFF, by using a small battery that can run the clock for a plurality of years when power is removed from the system. The Real Time Clock 415 is set to the correct time by using the Serial Communications Interface 425, and by issuing proper commands to the system using HyperTerminal or a similar communications program.

Silicon-Controlled Rectifier (SCR) Firing Board 423

In an example embodiment, a Connector to SCR Firing Board 461 provides a means to connect an optional Silicon Controlled Rectifier (SCR) Firing Board 423. An SCR Firing Board 423 provides the ability to use off-board Silicon-Controlled Rectifiers (SCRs) to conduct power to the system Anodes instead of the on-board MOSFETs. This is useful for very high power systems that require large amounts of charging currents to the Anode system. This is an alternate method to the standard on-board MOSFETs that are used to control power flowing to the system Anodes. When an SCR Firing Board 423 is used, the system firmware is changed to work properly with the SCRs. An external circuit board is used to provide firing control to the SCR gates.

Power MOSFETs 426

In an example embodiment, the Digital Controller 411 is supplied with four channels of Power MOSFETs 426, which are the main control devices that drive the system Anodes and pass current through the liquid Electrolyte(s). Each of the four channels consists of a Power MOSFET 426, a gate driver for each MOSFET, and an AND gate for each MOSFET that enables the Microprocessor 422 to provide pulse width modulated (PWM) signals that can be gated ON and OFF as required by the system firmware. The following components discussed in this section provide support for the operation of the circuit.

The Microprocessor 422 has built-in Pulse Width Modulation (PWM) capability. The Power MOSFETs 426 circuit uses PWM channels that are available in the Microprocessor 422. The Digital Controller 101 system firmware makes decisions about the Duty Cycle requirements of the pulse width modulator (PWM) channels, and adjusts the Duty Cycle based on system measurements as determined by the Analog to Digital Converter 414. For example, if a Reference Cell voltage as measured by the system is too low, the Microprocessor 422 increases the Duty Cycle of the PWM system applying additional current to the corresponding Anode, which over time will cause the Reference Cell voltage to rise.

In an example embodiment, the Microprocessor 422 also uses four of its I/O pins to gate the PWM signal ON and OFF during each electrical half-cycle for each of the channels. By applying a signal to one half of each AND gate (the other half is connected to the Microprocessor 422 PWM output) the Microprocessor 422 can switch the PWM gate drive to the MOSFETs ON and OFF without starting and stopping internal peripherals. This simplifies the control scheme.

The output waveforms may be monitored, for example with an oscilloscope, at test points, in order to measure ON Time and the PWM Duty Cycle. The gated PWM signals are applied to the gate driver circuits. Since the MOSFETs are connected in a "high side" circuit arrangement, the gate drivers act like level shifters to properly drive the MOSFETs into full conduction during the period of time that the PWM signal is high.

When each MOSFET is switched ON, the MOSFET conducts current from its drain terminal (which is connected to the DC Anode supply voltage) to its source (which in a Cathodic protection system is connected to the Anodes). The MOSFETs, which are controlled by the Microprocessor 422, provide the means to control current flowing from the Anodes to the structure that is being protected. Each MOSFET channel can be individually controlled, as needed, to ensure that the Anodes supply currents adequate to protect the structure.

Dip Switch 420

In an example embodiment, the Digital Controller 411 is provided with a small DIP Switch 420 that allows various settings to be selected for the Digital Controller 411. In an example embodiment, the DIP Switch 420 has four switches, and by switching the four switches to different positions, up to 16 different operating modes may be selected. Alternately, the switches can be used to turn unused MOSFET channels ON and OFF, as needed by the system.

Keypad Interface 416

In an example embodiment, the Digital Controller 411 is equipped with a Keypad Interface 416 configured to be used to connect a membrane keypad or an additional parallel port type device. The individual pins of the Keypad Interface 416 can be selected as either input or output lines, and can be read or written to by the Microprocessor 422 to control additional devices. The primary function of this port is to drive a matrix membrane keypad that is used by a user to control the various aspects of the system.

As an alternative, the Keypad Interface 416 can be deactivated, and instead communications to the Digital Controller 411 can be handled by the Serial Communications Interface 425 that connects a Universal Serial Bus (USB) port of an external computer, such as a laptop, to one of the internal serial communication Universal Asynchronous Receiver Transmitters (UARTs) inside Microprocessor 422.

Expansion Connectors 424

In an example embodiment, the Digital Controller 411 is supplied with Expansion Connectors 424 that enable the addition of optional circuit boards to the system.

Auxiliary Communication Connector 459

In an example embodiment, the Auxiliary Communication Connector 459 is used to provide optional remote communications using a standard RS-485 interface. RS-485 interfaces are a commonly used, high-speed serial communications system that uses either a two-wire or four-wire circuit arrangement to transmit data over distances up to one mile.

The signals used by a RS-485 interface are of a differential type that makes the bus less susceptible to noise. RS-485 systems are commonly used in factory communications systems. This connection allows a user to remotely monitor operation of the system if desired. Should RS-485 communications be desired an external circuit board with RS-485 drivers must be installed.

Expansion Connector SPI 454

In an example embodiment, the Expansion Connector SPI 454 is an expansion connector used to communicate with additional option boards that use the Serial Peripheral Interface (SPI) provided by the Microprocessor 422. This bus is high speed (1 MHz or above) and allows the Microprocessor 422 to select and communicate with additional peripheral devices. One primary use for this interface is to provide Ethernet communications, which can be used for communications via the global Internet, thereby allowing for remote monitoring of the Digital Controller 411, and its performance by a user via the Internet, or via internal site Ethernet networks. Other devices with different functions may be connected to the Digital Controller 411 as the need arises.

In-Circuit Serial Programming (ICSP) Connector 446

In an example embodiment, the In-Circuit Serial Programming (ICSP) Connector 446 is used to enable a user to connect directly to, and to program, the Microprocessor 422 with the operating program used in the system.

Inter-Integrated Circuit ($I^2C$) Serial Bus 456

In an example embodiment, the Digital Controller 411 is supplied with an Inter-Integrated Circuit ($I^2C$) Serial Bus 456 that enables the addition of optional circuit boards to the system.

Further in Regards to FIG. 6

Further in regards to FIG. 6, the following paragraphs provide additional discussion of the example method steps shown in FIG. 6.

Since the system utilizes a Microprocessor 422, on power up the Microprocessor 422 goes through an Initialize System 602 step. This Initialize System 602 step further includes a plurality of sub-steps to initialize the Microprocessor 422 and then initialize the system to ready it for operation. The plurality of sub-steps included in Initialize System 602 step include:

Initializing the Microprocessor 422 internal clock system;
Initializing system timers to operate the Task Scheduler and other functions;
Initializing the Microprocessor 422 interrupt system;
Initializing all of the Input/Output ports of the Microprocessor 422;
Initializing the Serial Controllers: Expansion Connector SPI 454, Inter-Integrated Circuit ($I^2C$) Serial Bus 456, and Serial Communications Interface 425;
Initializing the Front Panel Digital Display 421;
Initializing the Real Time Clock 415, and ensuring that it is running;
Initializing the Internal Temperature Measurement Device 412;
Initializing the pulse width modulator (PWM) peripheral;
Initializing the Analog to Digital Converter 414;
Initializing program variables and flags, and reading stored data from non-volatile memory to restore previous operating parameters; and
Initializing and enabling the Interrupt Controller system of Microprocessor 422.

Once Microprocessor 422 has completed the Initialize System 602 step, which sets up proper system operation, Microprocessor 422 performs the next step, which is Schedule, Coordinate, and Initiate System Operations with Task Scheduler 603. Task Scheduler sets a schedule for the Microprocessor 422 calling and processing the other individual program tasks. Each task runs until it completes, and then it returns control of Microprocessor 422 to the Task Scheduler. If required, each task may call additional subtasks as needed by the system. There are a plurality of tasks that are used to perform system operations. These tasks include:

Keypad Task: reads the system keypad;
Shunt #1 Task: reads the Shunt voltage (converts to current) for channel 1;
Shunt #2 Task: reads the Shunt voltage (converts to current) for channel 2;
Shunt #3 Task: reads the Shunt voltage (converts to current) for channel 3;

Shunt #4 Task: reads the Shunt voltage (converts to current) for channel 4;
Anode #1 Task: reads the Anode voltage for channel 1;
Anode #2 Task: reads the Anode voltage for channel 1;
Anode #3 Task: reads the Anode voltage for channel 1;
Anode #4 Task: reads the Anode voltage for channel 1;
RS-232 Task: manages serial communications to the console (laptop computer);
Display Task: manages the Front Panel Digital Display 421;
Temperature Task: reads the Internal Temperature Measurement Device 412 in the Digital Controller 411;
Read DIP Switch Task: reads the DIP Switch 420 on the circuit board;
Temperature Max-Min-Task—calculates and saves the minimum and maximum temperature;
Channel #1 Task—manages channel 1 PWM operations and MOSFET ON Time;
Channel #2 Task—manages channel 2 PWM operations and MOSFET ON Time;
Channel #3 Task—manages channel 3 PWM operations and MOSFET ON Time;
Channel #4 Task—manages channel 4 PWM operations and MOSFET ON Time;

Each one of these tasks performs a specific function for the system. Some of the tasks are nearly identical but perform actions on a different part of the system. For example, there are four Channel Tasks and they are essentially identical except that they work on different MOSFET channels and control separate Anodes. Some of the tasks used (in an example embodiment) will be described in detail below.

Channel Tasks

In an example embodiment, the Channel Tasks are the main functional tasks in the system firmware that perform the regulation function of the system. During system operation, the Task Scheduler calls the four Channel Tasks that manage how the PWM width and ON Time are calculated.

The Channel Tasks call another task that measures the Reference Cell voltage and compares it to the Target Voltage requested by a user. If the Reference Cell voltage is below target, the system will increase the Duty Cycle of the PWM pulses or, if required, increase the ON Time of the pulses up to about 8 milliseconds, which is slightly less than one electrical half-cycle at 60 Hz.

Conversely, if the Reference Cell voltage it too high, the Channel Task will reduce the PWM Duty Cycle, or the ON Time, or both (as required). The purpose of the Channel Task is to manage the current flow through the Anodes so as to maintain a proper Reference Cell voltage (with regards to the preset Reference Cell Target Voltage requested by a user).

The Channel Tasks also have the ability to allow a user to manually turn the MOSFETs ON individually, to measure maximum system current, or to perform other system tasks during initial system installation in the field. When commanded ON, the PWM Duty Cycle is set to 95%, and the ON Time is set to 8 milliseconds, so that current flows for almost all of the electrical half-cycle.

Shunt Tasks

In an example embodiment, the Shunt Tasks measure the voltage produced by the millivolt Shunts, and perform mathematical operations on the readings, so that a value representing the current flowing through the Anodes can be displayed for operator use. Each Shunt has a separate Task assigned to it that performs the measurements.

Reference Cell Tasks

In an example embodiment, there are six of these Reference Cell Tasks, one for each available Reference Cell connection. When each Reference Cell Task executes, it activates the reed relay associated with its channel, waits for the relay contacts to stop bouncing, and then measures the Reference Cell voltage. The measured voltage is then stored in memory for later use.

Anode Voltage Tasks

In an example embodiment, there are four of these Anode Voltage Tasks, one for each channel associated with each MOSFET. The Anode voltage is measured at the source of the MOSFETs. Since Anode voltage is not applied until the MOSFET for the channel to be measured is ON, each of these functions waits until the relevant MOSFET is commanded ON, and then it begins measurement of the Anode voltage.

Interrupt Service Routines (ISR)

In an example embodiment, the microprocessor is from the PIC32 family of microprocessors. One of the advantages of the PIC32 family of microprocessors is their extensive Interrupt Controller capability. When an interrupt occurs (e.g., an internal timer time-out, or an external signal is applied to one of the microprocessor input ports) the microprocessor stops what it is doing, saves its current state in a portion of its memory called the stack pointer, and then jumps to a special function that performs required processing associated with the particular interrupt that occurred.

These special functions are called interrupt service routines (ISRs). When execution of the ISR is completed, the microprocessor jumps back to where it was before the interrupt, recovers the information stored on the stack, and continues execution where it left off. This approach allows the microprocessor to respond very quickly to urgent tasks that require attention.

In addition to all of the above, the present invention allows for prioritization of interrupts, so that one interrupt has a higher priority over another. A high priority interrupt interrupts a lower priority interrupt, but a lower priority interrupt may not interrupt a higher priority interrupt. A lower priority interrupt will not execute until the higher priority interrupt is finished. This allows great flexibility in how the system hardware is controlled by the system firmware.

The microprocessor accepts interrupts from numerous sources both internal and external to the microprocessor, and triggers individual Interrupt Service Routines (ISRs) for each interrupt type to perform actions based on what interrupt occurred. The Digital Controller makes good use of the Interrupt Controller of Microprocessor 422. A brief description of the ISRs in an example embodiment of the present invention follows below.

Timer 1 ISR

In an example embodiment, the Timer 1 is the main system timer that controls the Task Scheduler. When Timer 1 reaches a set time, it causes an interrupt that causes the central Microprocessor to trigger Timer 1 ISR. This ISR resets Timer 1 for the next timeout, processes a system tick that indicates a set time interval has passed, and finally, clears the interrupt flag to ready the Microprocessor 422 for the next system tick. This function manages the key timing function of the Task Scheduler. Each tick represents $\frac{1}{16}$ second.

Real Time Clock ISR

In an example embodiment, the Real Time Clock ISR is triggered when the real time clock interrupts the system. This happens once per second, when the Real Time Clock ticks off one second. When this interrupt occurs, the Microprocessor sets a flag telling the Display Task to update the time on the display. The Real Time Clock ISR then clears the interrupt flag, in order to prepare the Microprocessor 422 for the next Real Time Clock interrupt.

Comparator ISR

In an example embodiment, the Comparator ISR responds to interrupts originating in the Analog Comparator in the Microprocessor 422. The inputs of the Analog Comparator are connected to the 60 Hz signal coming from the power transformer secondary in the power supply section. This enables the system to detect when a zero crossing of the 60 Hz power waveform occurs. This provides a convenient method to time the MOSFET control system.

In addition, the 60 Hz signal is highly frequency stable, and this allows the Microprocessor 422 to provide accurate timing of the MOSFET control. Using the timing results, the MOSFETs can be switched OFF at certain time so that voltage measurements on the Reference Cells can be made in a coordinated manner to prevent interference between channels.

This ISR controls the operations ticker that times the display intervals of information on the display. It runs counters used to schedule measurement periods for the Reference Cells, and also blinks a "heartbeat" LED on the circuit board to show that the system is operating properly.

USART ISR

In an example embodiment, there are two Serial Communications Ports on the circuit board. Each has its own ISR to handle communications coming into the respective Serial Communications Port from external devices. For example, when a user attaches a laptop computer to the Digital Controller and types characters, the USART receives each character and generates an interrupt informing the Microprocessor 422 that it has a character to process. The ISR is triggered and the Microprocessor 422 processes the character and acts on it as defined in the system program.

Keypad ISR

In an example embodiment, the Keypad ISR responds to a key press on a user interface keypad on the front panel of the Digital Controller, in a manner analogous to the behavior of the USART ISR described in the preceding paragraph.

Further in Regards to FIG. 13

Further in regards to FIG. 13, the following paragraphs provide additional discussion of system components shown in FIG. 13.

AC Power Supply 1301

An example embodiment of the Power Supply 1301 is switching regulator type AC power supply that utilizes 120 Volts (AC) and 60 Hz power (that is standard, for example, in the United States) that is transformer isolated. The power supply uses a step down transformer along with a primary fuse and protective metal oxide varistors to reduce potential damage from incoming voltage transients. The power supply also uses a common mode choke on the secondary side of the transformer to reduce conducted electro-magnetic interference both into and out of the system. The output of power transformer is rectified by four diodes that form a full-wave bridge rectifier. The output of the Digital Controller 1311 is filtered by capacitors before being applied to the main switching regulators.

The rectified and filtered power is then presented to two switching regulators. The first regulator supplies the main 5 volt power to the system. The second switching regulator supplies +15 volts that is used to drive the gates of the Power MOSFETs 1326. The Power MOSFETs 1326 require a slightly higher gate voltage than is supplied by the main regulator to properly saturate them when conduction is desired, so +15 volts is made available for the MOSFET gate drivers.

Also connected to the output of the 5 volt switching regulator is a 3.3 volt linear regulator used to provide power to the core logic of the Digital Controller 1311 and to several peripheral integrated circuits. The switching regulators and the linear regulator enable the power supply system is to supply +5V, +15V and +3.3V to the system.

Resistors and a clamp diode are also a part of the power supply system. The resistors and clamp diode provide a current limited and voltage clamped AC voltage to a comparator inside the Microprocessor 1322 that converts the 60 Hz AC input into a 60 Hz square wave whose edges are used to provide timing reference to the system. In turn, the Microprocessor 1322 uses these edges to mark the beginning of the 60 Hz AC cycle. Switching of the MOSFETs and an optional Silicon-Controlled Rectifier (SCR) control timing is based on this reference square wave. When the comparator generates an edge of the square wave an interrupt is sent to the Microprocessor 1322 interrupt processor which interrupts what the Microprocessor 1322 is doing to count time or for other functions.

Microprocessor 1322

An example embodiment of the Microprocessor 1322 used in the system is a Microchip Technology Inc.® Model PIC32MX575F512L 32-bit Microprocessor, which is used to perform all control and computational functions for the system. This Microprocessor has a plurality of internal peripherals that are used in system operations. The peripherals and their operation will be described elsewhere in this description, in regards to a method.

In order to properly operate the Microprocessor 1322, a clock 1315 is required in order to provide a clock signal that steps the Microprocessor through each instruction in the operating program. In an example embodiment, the clock 1315 is an 8 MHz oscillator that provides the necessary clock signal to the Microprocessor. Systems internal to the Microprocessor divide the clock signal by two, and then multiply the clock signal by 20 using an internal phase locked loop, so that the Microprocessor core operates at 80 MHz. The relatively high clock speed, plus other features internal to the Microprocessor (such as a 5-stage instruction pipeline) makes the Microprocessor a very high performance device.

A plurality of external components are directly connected to the Microprocessor 1322, and take advantage of the communications capabilities of the Microprocessor in order to transfer information to and from the Microprocessor, as required. These will be described immediately below, and in regards to a method, as appropriate.

DC Shunt Interface 1319 and Shunts 1357

In an example embodiment, the Digital Controller 1311 uses external precision Shunts 1357 located between the Power MOSFETs 1326 and the Anode 1305 in the corrosion protection system, in order to measure a Current flow 1306 to the Anode 1305. Each MOSFET channel has an associated Shunt used to measure current flow. In an example embodiment, the output from the Shunts 1357 has a maximum value of 50 millivolts when current flowing through the Shunt is at its rated value.

For example, if a Shunt 1357 being used is a 20 ampere Shunt, when 20 amperes are flowing through the Shunt, the sensing terminals of the Shunt will provide 50 millivolts to the Shunt amplifiers. This voltage must be amplified in order to bring it up to a level usable by the Analog to Digital Converter 1314 on the Microprocessor 1322. In an example embodiment, integrated circuits (e.g., DC Shunt Interface 1319) are used that act as Shunt Amplifiers with a multiplication factor of 60.

When using these Shunt Amplifiers, when a Shunt is providing full scale output of 50 millivolts, a resulting 3 volts is presented to the Analog to Digital Converter 1314. This is near the full scale rating of the Analog to Digital Converter 1314, thereby allowing better current measurement resolution. This voltage is clamped by Schottky diodes to prevent the voltage presented to the Analog to Digital Converter 1314 in the Microprocessor 1322 from exceeding its rated voltage of 3.3 volts. These Shunt Amplifiers also provide electrical isolation from the external power supply voltage (which can be as high as 30 volts).

The Shunt inputs to the amplifiers are also connected to a shunt connector, thereby providing a means to access the raw Shunt voltage for independent measurement by an external voltage measurement system. This enables a user to directly measure the Shunt voltages.

Reference Cell Inputs 1318

In an example embodiment, the Digital Controller 1311 is equipped with six Reference Cell inputs, and an external input connector (Inter-Integrated Circuit (I²C) Serial Bus 1356) for additional Reference Cell channels, if needed. These inputs are used to measure a reference voltage between the Reference Cell and the protected structure. The purpose behind Reference Cell voltage measurement is described elsewhere in this document. These inputs are switched using reed relays (relay coils), which allow for isolation of each individual Reference Cell from the system when required.

When a Reference Cell reading is needed, the Microprocessor 1322 activates an associated relay coil, thereby momentarily closing the contacts of the Reference Cell. When the contacts are closed, the Reference Cell being measured is connected to a buffer amplifier, and then to the Analog to Digital Converter 1314 of the Microprocessor 1322. The Reference Cell voltage measurement is taken by the Analog to Digital Converter 1314 of the Microprocessor 1322 while the relay is closed.

When the measurement is completed, the relay is deactivated, and the system performs necessary adjustment actions depending on the voltage that was measured. If required, an additional relay is used to isolate the Digital Controller 1311 from the protected structure. Normally the additional relay is continually activated, and functions to keep the system attached to structure ground.

The Reference Cell relays are switched by using individual I/O port lines from the Microprocessor 1322 which are buffered by a power driver IC, that is used to switch the relay coils and is designed to handle the current requirements of the relays as well as switching the inductive load offered by the relay coils. The voltage from the Reference Cells, after being switched by the relays, is buffered by an operational amplifier and presented to the Analog to Digital Converter 1314 in the Microprocessor 1322.

Serial Communications Interface 1325

In an example embodiment, the Digital Controller 1311 is provided with a Serial Communications Interface 1325 that connects a Universal Serial Bus (USB) port of an external computer, such as a laptop, to one of the internal serial communication Universal Asynchronous Receiver Transmitters (UARTs) inside Microprocessor 1322. The serial interface can communicate at each of a plurality of serial communication speeds, each of which has a different baud rate. A plurality of standard baud rates may be set in the system. A popular standard baud rate is 19,200 baud.

The serial interface enables a user to set operating parameters, such as Shunt ratings and Reference Cell Target Voltages, and also to receive reports from the system detailing operating parameters such as: currents, voltages, MOSFET ON Times, system service date, serial number and additional operating parameters and system information.

Internal Temperature Measurement Device 1312

In an example embodiment, the system is equipped with an Internal Temperature Measurement Device 1312 that is configured to report the current circuit board temperature, and also to report the maximum and minimum internal temperature experienced by the Digital Controller 1311. This can be useful for problem diagnosis or other temperature related information. Temperature readings are obtained from the Internal Temperature Measurement Device 1312 via the Inter-Integrated Circuit (I²C) Serial Bus 1356 inside Microprocessor 1322.

Non-Volatile Memory 1313

In an example embodiment, the Digital Controller 1311 uses the Non-Volatile Memory 1313 to store controller settings and data in such a manner that the data remains viable even if power is removed from the system. Non-Volatile Memory 1313 also uses the Serial Communications Interface 1325 to transfer data back and forth from the Microprocessor 1322 to the Non-Volatile Memory 1313. On power up the system firmware reads settings and data from the Non-Volatile Memory 1313 and uses it to restart the system to its last known operational state.

Analog to Digital Converter 1314 and Voltage Reference 1327

In an example embodiment, in order to make an accurate conversion of analog signals from such sources as from 50 millivolt Shunts or from the Reference Cells 1304 or 1304, the Analog to Digital Converter 1314 requires an accurate reference voltage to make comparisons against. The accurate voltage needed for the system is provided by the Voltage Reference 1327, which is an accurate 3.3 volt source that the Analog to Digital Converter 1314 uses as the reference for its voltage conversions. This allows the system to measure voltages and currents accurately. Those measurement results are then used by the Microprocessor 1322 to make control decisions for the system.

Real Time Clock 1315

In an example embodiment, the system uses a Real Time Clock 1315, along with its associated components, to enable the system to keep track of time with reasonable accuracy. The time data is used to time stamp reports, to report the date and time when certain incidents occur and for other general reporting information that requires time related information. The Real Time Clock 1315 is maintained when power is OFF, by using a small battery that can run the clock for a plurality of years when power is removed from the system. The Real Time Clock 1315 is set to the correct time by using the Serial Communications Interface 1325, and by issuing proper commands to the system using HyperTerminal or a similar communications program.

Power MOSFETs 1326

In an example embodiment, the Digital Controller 1311 is supplied with four channels of Power MOSFETs 1326, which are the main control devices that drive the system Anodes and pass current through the liquid Electrolyte(s). Each of the four channels consists of a Power MOSFET 1326, a gate driver for each MOSFET, and an AND gate for each MOSFET that enables the Microprocessor 1322 to provide pulse width modulated (PWM) signals that can be gated ON and OFF as required by the system firmware. The following components discussed in this section provide support for the operation of the circuit.

The Microprocessor 1322 has built-in Pulse Width Modulation (PWM) capability. The Power MOSFETs 1326 circuit uses PWM channels that are available in the Microprocessor 1322. The Digital Controller 101 system firmware makes decisions about the Duty Cycle requirements of the pulse width modulator (PWM) channels, and adjusts the Duty Cycle based on system measurements as determined by the Analog to Digital Converter 1314. For example, if a Reference Cell voltage as measured by the system is too low, the Microprocessor 1322 increases the Duty Cycle of the PWM system applying additional current to the corresponding Anode, which over time will cause the Reference Cell voltage to rise.

In an example embodiment, the Microprocessor 1322 also uses four of its I/O pins to gate the PWM signal ON and OFF during each electrical half-cycle for each of the channels. By applying a signal to one half of each AND gate (the other half is connected to the Microprocessor 1322 PWM output) the Microprocessor 1322 can switch the PWM gate drive to the MOSFETs ON and OFF without starting and stopping internal peripherals. This simplifies the control scheme.

The output waveforms may be monitored, for example with an oscilloscope, at test points, in order to measure ON Time and the PWM Duty Cycle. The gated PWM signals are applied to the gate driver circuits. Since the MOSFETs are connected in a "high side" circuit arrangement, the gate drivers act like level shifters to properly drive the MOSFETs into full conduction during the period of time that the PWM signal is high.

When each MOSFET is switched ON, the MOSFET conducts current from its drain terminal (which is connected to the DC Anode supply voltage) to its source (which in a Cathodic protection system is connected to the Anodes). The MOSFETs, which are controlled by the Microprocessor 1322, provide the means to control current flowing from the Anodes to the structure that is being protected. Each MOSFET channel can be individually controlled, as needed, to ensure that the Anodes supply currents adequate to protect the structure.

Inter-Integrated Circuit (I²C) Serial Bus 1356

In an example embodiment, the Digital Controller 1311 is supplied with an Inter-Integrated Circuit (I²C) Serial Bus 1356 that enables the addition of optional circuit boards to the system.

CONCLUSION

The Digital Controller in the present invention uses a high performance Microprocessor, along with a variety of applicable hardware peripherals, and operating system firmware, to accomplish the task of monitoring and controlling the elements of a Cathodic protection system (or alternatively, an Anodic protection system). The Digital Controller is a flexible product that can be reconfigured to handle a large plurality of different system applications. The control regulation is more precise than in other solutions, thereby allowing more precise control of the operating parameters of such a system.

The invention claimed is:

1. An apparatus for controlling corrosion of a plurality of tanks each containing electrolyte, the apparatus comprising:
   an external power supply;
   a plurality of electrodes, each immersed in the electrolyte in one of the plurality of tanks and coupled to the external power supply;
   a plurality of reference cells, each immersed in the electrolyte in one of the plurality of tanks;
   a plurality of control circuits, each coupled to one of the reference cells; and
   a digital controller configured to, for each of the reference cells, individually control the coupled control circuit to control current applied to each of the electrodes by:
      instructing each control circuit to simultaneously and independently:
         measure and store a reference voltage between the coupled reference cell and the corresponding tank at a time when no electrical current is flowing through the corresponding electrode;
         compare the measured reference voltage with a preset target voltage for the coupled reference cell;
         apply a pulse width modulated electrical current through the corresponding electrode;
         stop the pulse width modulated electrical current to measure and store a new measured reference voltage; and
         incrementally adjust the pulse width modulated electrical current based on the comparison of the measured reference voltage to the preset target voltage of the coupled reference cell in discrete steps; and
      instructing each control circuit to repeat the steps of measuring, comparing, applying, stopping, and incrementally adjusting the pulse width modulated electrical current until its measured reference voltage equals its preset target voltage.

2. The apparatus of claim 1, wherein each electrode includes an anode.

3. The apparatus of claim 1, wherein the pulse width and a duration of the time are different for each of the electrodes.

4. The apparatus of claim 1, wherein each of the plurality of control circuits comprises a circuit board that includes a measuring circuit.

5. A method for controlling corrosion of a plurality of tanks each containing electrolyte, comprising:
   providing a plurality of electrodes immersed in the electrolyte in one of the plurality of tanks and coupled to an external power supply;
   providing a plurality of reference cells immersed in the electrolyte one of the plurality of tanks, each one of the plurality of reference cells corresponding to a respective one of the plurality of electrodes in one-to-one correspondence;
   providing a plurality of control circuits, each coupled to one of the reference cells; and
   causing a digital controller to, for each reference cell, individually control the control circuit of each of the reference cells to control the current applied to each of the electrodes by instructing each control circuit to simultaneously and independently:
      measure and store a measured reference voltage, the reference voltage measured between a reference cell and the corresponding tank at a time when no electrical current is flowing through a respective electrode;
      compare the measured reference voltage with a preset target voltage of the respective reference cell;
      apply a pulse width modulated electrical current through the corresponding electrode;
      stop the pulse width modulated electrical current to measure and store a new reference voltage;
      incrementally adjust the pulse width modulated electrical current for each respective reference cell, based on the comparison of at least one of the measured reference voltages with the preset target voltage in discrete steps; and repeat the steps of measuring, comparing, applying, stopping, and incrementally adjusting the pulse width modulated electrical current, until a respective measured reference voltage equals the respective preset target voltage in each reference cell;

wherein the digital controller comprises:

a microprocessor, including an analog-to-digital converter disposed inside the microprocessor, the microprocessor being configured to incrementally adjust the pulse width modulated electrical current for each reference cell in discrete steps, based on the comparison of its measured reference voltage with the Preset target voltage, until the measured reference voltage equals the preset target voltage for each reference cell;

a non-volatile memory connected to the microprocessor;

an expansion inter-integrated circuit (I2e) serial communications bus connected to the microprocessor;

an internal temperature measurement device connected to the microprocessor;

a real-time clock connected to the microprocessor;

reference cell inputs connected to the microprocessor and to the plurality of reference cells;

a plurality of Metal-Oxide-Semiconductor Field-Effect Transistors (MOSFETs); and a plurality of shunts in series with the plurality of electrodes, with voltage signals across the shunts being connected to the microprocessor via a shunt interface, and the shunts also being connected to the MOSFETs.

6. The method for controlling corrosion of a plurality of tanks each containing electrolyte of claim 5, wherein the incremental adjustment of the pulse width modulated electrical current includes the digital controller controlling a variable voltage DC power supply to one of the plurality electrodes such that:

when a pulse width modulation (PWM) duty cycle of the one of the plurality electrodes remains below a predetermined low value for a predetermined amount of time, the digital controller increases the PWM duty cycle of the respective MOSFETs, by decreasing the power supply voltage to the one of the plurality electrodes, and thereby increasing the pulse width modulation (PWM) duty cycle of the current flowing into the one of the plurality electrodes, and when a PWM duty cycle of the one of the plurality electrodes remains at a predetermined high value for a predetermined amount of time, the digital controller decreases the PWM duty cycle of the respective MOSFETs, by increasing the power supply voltage to the one of the plurality electrodes, and thereby decreasing the pulse width modulation (PWM) duty cycle of the current flowing into the one of the plurality electrodes.

7. The method for controlling corrosion of a plurality of tanks each containing electrolyte of claim 5, wherein the digital controller is further configured to:

store respective measurement times of the reference voltages;

cease power supply cycles for a predetermined length of time;

compare voltages of the respective reference cell at a plurality of measurement times before and after the cessation of the power supply cycles;

determine a polarization decay time, based on the stored reference voltages and measurement times, in order to monitor the performance of the system, determine if the system is attaining protection of the structure as per an accepted standard, and determine the corrosion nature of the structure being protected; and resume normal operation of the digital controller after determining the polarization decay time.

8. The method for controlling corrosion of a plurality of tanks each containing electrolyte of claim 7, wherein each of the plurality of electrodes includes an anode, and the accepted standard is a standard formulated by the National Association of Corrosion Engineers.

9. An apparatus for controlling corrosion of a plurality of tanks each containing electrolyte, the apparatus comprising:

an external power supply;

a plurality of electrodes, each immersed in the electrolyte in one of the plurality of tanks and coupled to the external power supply;

a plurality of reference cells, each immersed in the electrolyte in one of the plurality of tanks and coupled to the external power supply;

a plurality of control circuits, each coupled to one of the reference cells; and a digital controller configured to, for each of the reference cells, individually control the coupled control circuit to control current applied to each of the electrodes by instructing each control circuit to simultaneously and independently for all of the electrodes, adjust electrical current, and measure a reference voltage between the coupled reference cell and the corresponding tank at a time when no electrical current is flowing through the corresponding electrode, the digital controller including:

a microprocessor, including an analog-to-digital converter disposed inside the microprocessor, the microprocessor being configured to incrementally adjust a pulse width modulated electrical current for each reference cell in discrete steps, based on the comparison of its measured reference voltage with a preset target voltage, until the measured reference voltage equals the preset target voltage for each reference cell;

a non-volatile memory connected to the microprocessor;

an expansion inter-integrated circuit (I2e) serial communications bus connected to the microprocessor;

an internal temperature measurement device connected to the microprocessor;

a real-time clock connected to the microprocessor;

reference cell inputs connected to the microprocessor and to the plurality of reference cells;

a plurality of Metal-Oxide-Semiconductor Field-Effect Transistors (MOSFETs); and a plurality of shunts in series with the plurality of electrodes, with voltage signals across the shunts being connected to the microprocessor via a shunt interface, and the shunts also being connected to the MOSFETs.

10. The apparatus of claim 9, wherein the microprocessor is further configured to:

time stamp operational data gathered from the plurality of reference cells or shunts with time data acquired from the real-time clock; and store time stamped data in the nonvolatile memory.

11. The apparatus of claim 10, wherein the microprocessor is further configured to retrieve time stamped data stored in the non-volatile memory for use in performance calculations.

12. The apparatus of claim 11, wherein the digital controller is further configured to:
adjust currents of each of the plurality of electrodes to provide optimal corrosion protection for each of the plurality of tanks.

13. The apparatus of claim 12, wherein the digital controller is further configured to:
use at least one of averaging techniques and high/low reference cell data to adjust the plurality of electrodes to cause apparatus operations to comply with an accepted protective standard.

14. The apparatus of claim 9, further comprising:
a plurality of auxiliary electrodes; and
a plurality of auxiliary reference cells,
wherein the auxiliary plurality of electrodes and the plurality of auxiliary reference cells are positioned in at least one of the plurality of tanks so as to ensure continued corrosion protection in event of a failure of one of the plurality of electrodes or one of the plurality of reference cells.

15. The apparatus of claim 9, wherein each of the plurality of the MOSFETs is connected between one of the plurality of tanks and a negative power supply terminal of the external power supply.

16. The apparatus of claim 9, further comprising:
a plurality of power supplies,
wherein a separate power supply is used for each MOSFET.

17. The apparatus of claim 9, further comprising:
a plurality of variable voltage power supplies,
wherein control of the plurality of electrodes, reference cells, and variable voltage power supplies is via any combination of a digital-to-analog converter (DAC), a parallel communications interface, a serial communications interface, or a pulse width modulation (PWM) control input to the external power supply.

18. The apparatus of claim 9, further comprising:
a keypad interface connected to the microprocessor and a keyboard external to the digital controller; and
a connector to a Silicon-Controlled Rectifier (SCRs) Firing board, the connector connected to the microprocessor and a Silicon-Controlled Rectifier (SCRs) Firing board external to the digital controller.

19. The apparatus of claim 9, further comprising:
a variable voltage DC power supply connected to one of the plurality of electrodes,
wherein the digital controller is further configured to control the variable voltage DC power supply such that:
when a pulse width modulation (PWM) duty cycle of the one of the plurality of electrodes remains below a predetermined low value for a predetermined amount of time, the digital controller increases the PWM duty cycle of respective MOSFETs, by decreasing power supply voltage to the one of the plurality of electrodes, and thereby increasing the PWM duty cycle of the current flowing into the one of the plurality of electrodes, and
when the PWM duty cycle of the one of the plurality of electrodes remains at a predetermined high value for a predetermined amount of time, the digital controller decreases the PWM duty cycle of the respective MOSFETs, by increasing the power supply voltage to the one of the plurality of electrodes and thereby decreasing the PWM duty cycle of the current flowing into the one of the plurality of electrodes.

20. The apparatus of claim 9, wherein the digital controller is further configured to:
store respective measurement times of the reference voltages;
cease power supply cycles for a predetermined length of time;
compare voltages of the respective reference cell at a plurality of measurement times before and after the cessation of the power supply cycles;
determine a polarization decay time, based on the stored reference voltages and measurement times to monitor performance of the apparatus, determine if the apparatus is attaining protection of the plurality of tanks according to an accepted standard, and determine a corrosion type of the plurality of tanks; and
resume normal operation of the digital controller after determining the polarization decay time.

21. The apparatus of claim 20, wherein each electrode includes an anode.

* * * * *